(12) United States Patent
Cohen et al.

(10) Patent No.: US 8,296,051 B2
(45) Date of Patent: Oct. 23, 2012

(54) GENERALIZED HIGH PERFORMANCE NAVIGATION SYSTEM

(75) Inventors: Clark E. Cohen, Washington, DC (US);
David A. Whelan, Newport Coast, CA (US); Robert W. Brumley, Narberth, PA (US); Gregory M. Gutt, Asburn, VA (US); Barton G. Ferrell, Troy, IL (US)

(73) Assignee: The Boeing Company, Chicago, IL (US)

( * ) Notice: Subject to any disclaimer, the term of this patent is extended or adjusted under 35 U.S.C. 154(b) by 1226 days.

(21) Appl. No.: 11/749,597

(22) Filed: May 16, 2007

(65) Prior Publication Data

US 2008/0059059 A1 Mar. 6, 2008

Related U.S. Application Data

(60) Provisional application No. 60/801,764, filed on May 18, 2006.

(51) Int. Cl.
*G06F 19/00* (2006.01)
*H04B 7/19* (2006.01)

(52) U.S. Cl. .................. 701/207; 701/213; 342/357.16; 342/357.01; 455/13.3; 455/430

(58) Field of Classification Search .................. 701/213, 701/215, 200, 207; 342/357.02, 357.09, 342/257.16, 357.01; 455/456.5, 456.6, 13.3, 455/430

See application file for complete search history.

(56) References Cited

U.S. PATENT DOCUMENTS

| 3,473,126 | A |   | 10/1969 | Guenard |
|---|---|---|---|---|
| 3,517,388 | A |   | 6/1970 | Vermillion |
| 3,774,208 | A | * | 11/1973 | Dorn et al. ............ 342/14 |
| 4,103,236 | A | * | 7/1978 | Deserno et al. .......... 455/1 |
| 4,697,157 | A | * | 9/1987 | Buddecke et al. ........ 331/78 |
| 5,365,450 | A | * | 11/1994 | Schuchman et al. ...... 455/456.3 |
| 5,463,400 | A | * | 10/1995 | Tayloe ................ 342/352 |
| 5,510,801 | A | * | 4/1996 | Engelbrecht et al. ...... 342/457 |
| 5,532,696 | A | * | 7/1996 | Cyrulik et al. .......... 342/14 |
| 5,644,572 | A | * | 7/1997 | Olds et al. ............. 370/324 |
| 5,646,630 | A | * | 7/1997 | Sheynblat et al. ........ 342/357.31 |
| 5,812,086 | A | * | 9/1998 | Bertiger et al. ......... 342/357.48 |
| 5,812,961 | A | * | 9/1998 | Enge et al. ............ 701/470 |
| 5,822,429 | A | * | 10/1998 | Casabona et al. ........ 380/252 |

(Continued)

FOREIGN PATENT DOCUMENTS

WO    WO 2005/081011    9/2005

(Continued)

OTHER PUBLICATIONS

U.S. Appl. No. 12/130,880, Whelan et al.

(Continued)

*Primary Examiner* — Ronnie Mancho

(74) *Attorney, Agent, or Firm* — Haynes and Boone, LLP

(57) ABSTRACT

A generalized high performance navigation system is provided using low earth orbit (LEO) satellites. In one embodiment, a method of performing navigation includes receiving a LEO signal from a LEO satellite. The method also includes decoding a navigation signal from the LEO signal. The method further includes receiving first and second ranging signals from first and second ranging sources, respectively. In addition, the method includes determining calibration information associated with the first and second ranging sources. The method also includes calculating a position using the navigation signal, the first and second ranging signals, and the calibration information.

42 Claims, 34 Drawing Sheets

U.S. PATENT DOCUMENTS

| | | | |
|---|---|---|---|
| 5,831,574 A * | 11/1998 | Krasner | 342/357.74 |
| 5,841,396 A | 11/1998 | Krasner | |
| 5,841,398 A * | 11/1998 | Brock | 342/357.02 |
| 5,944,770 A | 8/1999 | Enge et al. | |
| 6,157,621 A * | 12/2000 | Brown et al. | 370/310 |
| 6,178,195 B1 | 1/2001 | Durboraw, III et al. | |
| 6,195,529 B1 | 2/2001 | Linz et al. | |
| 6,266,533 B1 | 7/2001 | Zadeh et al. | |
| 6,271,788 B1 * | 8/2001 | Longaker et al. | 342/357.03 |
| 6,373,432 B1 | 4/2002 | Rabinowitz et al. | |
| 6,389,291 B1 | 5/2002 | Pande et al. | |
| 6,393,254 B1 | 5/2002 | Pousada Carballo et al. | |
| 6,400,314 B1 | 6/2002 | Krasner | |
| 6,433,734 B1 | 8/2002 | Krasner | |
| 6,526,352 B1 | 2/2003 | Breed et al. | |
| 6,542,823 B2 | 4/2003 | Garin et al. | |
| 6,633,255 B2 | 10/2003 | Krasner | |
| 6,674,398 B2 | 1/2004 | Murphy | |
| 6,697,008 B1 | 2/2004 | Sternowski | |
| 6,717,547 B2 | 4/2004 | Spilker et al. | |
| 6,785,553 B2 * | 8/2004 | Chang et al. | 455/456.5 |
| 6,859,173 B2 | 2/2005 | Spilker et al. | |
| 6,922,546 B1 | 7/2005 | Da et al. | |
| 6,937,187 B2 | 8/2005 | van Diggelen et al. | |
| RE38,808 E | 10/2005 | Schuchman et al. | |
| 7,030,814 B2 | 4/2006 | Stone et al. | |
| 7,042,392 B2 | 5/2006 | Whelan et al. | |
| 7,400,857 B2 * | 7/2008 | Chang et al. | 455/12.1 |
| 2002/0003490 A1 | 1/2002 | Chang et al. | |
| 2002/0082024 A1 | 6/2002 | Bajikar | |
| 2004/0042576 A1 | 3/2004 | Anderson | |
| 2004/0078594 A1 | 4/2004 | Scott | |
| 2005/0156782 A1 | 7/2005 | Whelan et al. | |
| 2005/0159891 A1 * | 7/2005 | Cohen et al. | 701/213 |
| 2006/0250303 A1 | 11/2006 | Thiel et al. | |
| 2007/0058161 A1 * | 3/2007 | Nichols et al. | 356/139.01 |
| 2007/0236387 A1 | 10/2007 | Monnerat | |
| 2008/0001818 A1 | 1/2008 | Cohen et al. | |
| 2008/0001819 A1 | 1/2008 | Cohen et al. | |
| 2008/0059059 A1 | 3/2008 | Cohen et al. | |
| 2008/0169958 A1 | 7/2008 | Cohen et al. | |
| 2008/0224924 A1 | 9/2008 | Lethbridge | |
| 2009/0315764 A1 | 12/2009 | Cohen et al. | |
| 2009/0315769 A1 | 12/2009 | Whelan et al. | |
| 2010/0171652 A1 | 7/2010 | Gutt et al. | |

FOREIGN PATENT DOCUMENTS

| | | |
|---|---|---|
| WO | WO 2007/056738 | 5/2007 |

OTHER PUBLICATIONS

U.S. Appl. No. 12/130,893, Cohen et al.
U.S. Appl. No. 12/349,362, Gutt et al.
GP World, Centimeter-Accuracy Indoor Navigation Using GPS-Like Pseudolites, http://www.gpsworld.com/gpsworld/Design+Challenge/Centimeter-Accuracy-Indoor-Navigation-Using-GPS-Li/ArticleLong/Article/detail/3086, Nov. 1, 2001, 7 pages.
U.S. Appl. No. 11/268,317, filed Nov. 7, 2005, Cohen et al.
NAL—Network Reference—Iridium Subscriber Unit, http://www.nalresearch.com/NetRef_IridiumSubscriberUnit.html, 2006, 2 pages.
Globalstar—Wilipedia, the free encyclopedia, http://en.wikipedia.org/wiki/ Globalstar, Jul. 17, 2006, 3 pages.
Iridium (satellite)—Wikipedia, the free encyclopedia, http://en.wikipedia.org/wiki/Iridium_%28satellite%29, Jul. 19, 2006, 4 pages.
Kyriazakos et al., Localization of Mobile Terminals, based on a Hybrid Satellite-assisted and Network-based Techniques, 2000, 5 pages.
Stamoulakatos et al., A Review on Cellular Location Methods Targeting Location Based Services, Proceedings of the IASTED International Conference, Sep. 8-10, 2004, 7 pages.
Laitinen et al., Cellular network optimisation based on mobile location, 2001, 51 pages.
ECC Report 95, Electronic Communications Committee (ECC) within the European Conference of Postal and Telecommunications Administrations (CEPT), Sharing Between MSS Systems Using TDMA and MSS Systems Using CDMA in the Band 1610-1626.5 Mhz, Febrary 2007, 38 pages.
ICAO Technical Manual for Iridium, Aeronautical Mobile Satellite (Route) Service, Draft v1.1, May 19, 2006, 48 pages.
Implementation Manual for IRIDIUM Satellite Communications Service, Draft v.1.0, Feb. 15, 2006, 59 pages.
Chowdhury M.R. Shahriar, Mitigation of Interference from Iridium Satellites by Parametric Estimation and Substraction, Dec. 1, 2006, 111 pages.
Agrawal et al., "GPS: Location-tracking technology", Computer publication, Apr. 1, 2002, pp. 92-94.
U.S. Appl. No. 12/833,795, Cohen et al.
Fossa et al., Department of Electrical and Computer Engineering, An Overview of the Iridium Low Earth Orbit (LEO) Satellite System, 1998 IEEE, pp. 152-159.

* cited by examiner 128-bit Integer PRN Word from Generator—effectively a random bit stream Interpret as a fixed-point random variable, X, with implicit leading zero, uniformly distributed in the domain 0≤X<1.

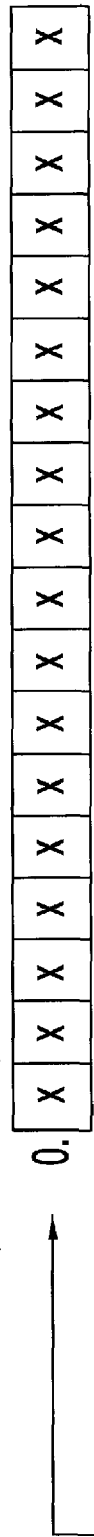

We want to synthesize an integer PRN, Y, uniformly distributed over the domain 0≤Y<M, where M is the desired integer modulus. Therefore, Y=floor(M*X), where the multiply is fixed point.

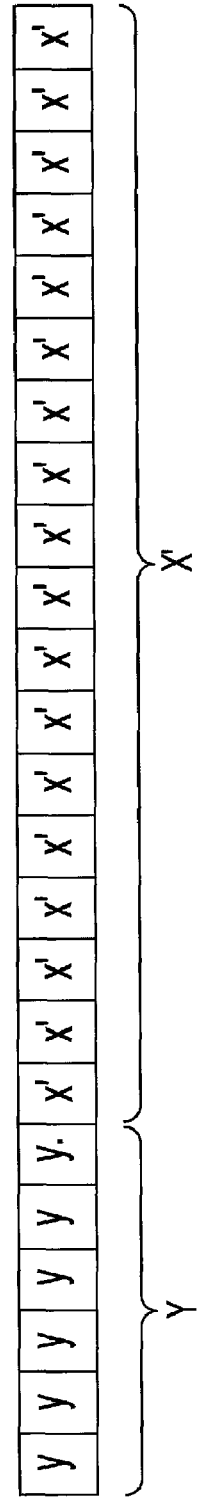

As long as a reasonable margin of PRN entropy remains pooled to the right of the decimal place, additional PRN modulo integers for any new value M may be generated by looping back.

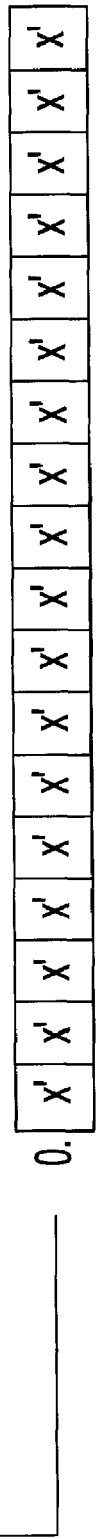

Modulo Arithmetic Ensures Near-Uniform Probability Distributions. Employ All Leading Unused Bits to Maximize Precision.

FIG. 15

$$\frac{d}{dt}\begin{bmatrix}\overline{y}\\\overline{r}\\\overline{v}\\\overline{\psi}\\\overline{b_a}\\\overline{b_g}\\\overline{\beta_\perp}\\\overline{\dot{\beta}_\perp}\\\overline{\tau}\\\overline{\dot{\tau}}\end{bmatrix}=\begin{bmatrix}-S^T & & & -S^TA_0^TB^* & & & & & 0 & 0\\ & I & & & & & & & & \\ & G_{vr} & \Omega_{vv} & G_{v\psi} & I & & & & & \\ & & & \Omega_{\psi\psi} & & I & & & & \\ & & & & -\tau_a^{-1}I & & & & & \\ & & & & & -\tau_g^{-1}I & & & & \\ & & & & & & V_\perp & -1 & 0 & \\ & & & & & & I & -\tau_{\overline{\beta}}^{-1} & & \\ & & & & & & & & 0 & 1 \\ & & & & & & & & 0 & -\tau_t^{-1}\end{bmatrix}\begin{bmatrix}\overline{y}\\\overline{r}\\\overline{v}\\\overline{\psi}\\\overline{b_a}\\\overline{b_g}\\\overline{\beta_\perp}\\\overline{\dot{\beta}_\perp}\\\overline{\tau}\\\overline{\dot{\tau}}\end{bmatrix}+\begin{bmatrix}\Delta\varphi|_{x_0} & -S^TA_0^Tb\\ 0 & 0\\ 0 & 0\\ 0 & 0\\ 0 & 0\\ 0 & 0\\ \hline 0 & 0\\ 0 & 0\\ \hline 0 & 0\\ 0 & 0\end{bmatrix}_{\sim 2004}+\begin{bmatrix}0\\0\\w_{VRW}\\w_{ARW}\\w_a\\w_g\\\hline 0\\w_{\dot{\beta}}\\\hline w_{\dot{\tau}}\\w\end{bmatrix}$$

$$\frac{1}{T}\int_{(k-1)T}^{kT}[\varphi(t)-\overline{\varphi}(t)]dt=\begin{bmatrix}\Delta y_{GPS}\\\Delta y_{LEO}\end{bmatrix}_k \sim 2002$$

$$\Delta\varphi|_{x_0}=\|X(t)-X_{sat}(t)\|_2+[\varphi_{reference}(t)-\rho_{reference}(t)]+\rho_t-\rho_i \sim 2006$$

*FIG. 20*

GENERALIZED HIGH PERFORMANCE NAVIGATION SYSTEM

CROSS-REFERENCE TO RELATED APPLICATIONS

This application claims the benefit of U.S. Provisional Patent Application No. 60/801,764 filed on May 18, 2006 and entitled "Generalized high performance, low-cost navigation system" which is incorporated herein by reference.

TECHNICAL FIELD

The present invention relates generally to navigation and, more particularly, to satellite-based navigation techniques.

BACKGROUND

Performance of a navigation system can be determined by the error distribution in navigation measurements (e.g., accuracy) provided by the system. System performance may also depend on its ability to provide timely warnings to users when it should not be used (e.g., integrity). Performance may also be measured by how long a navigation system takes to achieve its first position fix from a cold start (e.g., time to first fix). In addition, system performance may depend on the fraction of time or particular circumstances in which specified performance parameters fall within specified limits (e.g., availability).

Unfortunately, the navigation signals provided by various existing navigation systems often do not provide satisfactory system performance. In particular, the signal power, bandwidth, and geometrical leverage of such navigation signals are generally insufficient to meet the needs of many demanding usage scenarios.

Existing navigation approaches based, for example, on Global Positioning System (GPS) signals often provide insufficient signal power or geometry to readily penetrate buildings or urban canyons. Such signals may also be susceptible to jamming in hostile environments, and can prevent their usage in safety-of-life applications. Other navigation approaches based, for example, on cellular telephone or television signals typically lack vertical navigation information.

SUMMARY

In accordance with one embodiment of the invention, a method of performing navigation includes receiving a low earth orbit (LEO) signal from a LEO satellite; decoding a navigation signal from the LEO signal; receiving first and second ranging signals from first and second ranging sources, respectively; determining calibration information associated with the first and second ranging sources; and calculating a position using the navigation signal, the first and second ranging signals, and the calibration information.

In accordance with another embodiment of the invention, a navigation device includes an antenna adapted to receive a LEO signal from a LEO satellite and receive first and second ranging signals from first and second ranging sources, respectively; a receiver processor adapted to downconvert the LEO signal for further processing; and a navigation processor adapted to decode a navigation signal from the LEO signal, and adapted to calculate a position of the navigation device using the navigation signal, the first and second ranging signals, and calibration information associated with the first and second ranging sources.

In accordance with another embodiment of the invention, a navigation device includes means for receiving a LEO signal from a LEO satellite; means for decoding a navigation signal from the LEO signal; means for receiving first and second ranging signals from first and second ranging sources, respectively; means for determining calibration information associated with the first and second ranging sources; and means for calculating a position using the navigation signal, the first and second ranging signals, and the calibration information.

In accordance with another embodiment of the invention, a method of providing a LEO signal from a LEO satellite includes providing a plurality of transmit channels over a plurality of transmit slots, wherein the transmit channels comprise a set of communication channels and a set of navigation channels; generating a first pseudo random noise (PRN) ranging overlay corresponding to a navigation signal; applying the first PRN ranging overlay to a first set of the navigation channels; combining the communication channels and the navigation channels into a LEO signal; and broadcasting the LEO signal from the LEO satellite.

In accordance with another embodiment of the invention, a LEO satellite includes an antenna adapted to broadcast a LEO signal from the LEO satellite; and a processor adapted to: provide a plurality of transmit channels over a plurality of transmit slots, wherein the transmit channels comprise a set of communication channels and a set of navigation channels, generate a first PRN ranging overlay corresponding to a navigation signal, apply the first PRN ranging overlay to a first set of the navigation channels, and combine the communication channels and the navigation channels into the LEO signal.

In accordance with another embodiment of the invention, a LEO satellite includes means for providing a plurality of transmit channels over a plurality of transmit slots, wherein the transmit channels comprise a set of communication channels and a set of navigation channels; means for generating a first PRN ranging overlay corresponding to a navigation signal; means for applying the first PRN ranging overlay to a first set of the navigation channels; means for combining the communication channels and the navigation channels into a LEO signal; and means for broadcasting the LEO signal from the LEO satellite.

In accordance with another embodiment of the invention, a method of providing a data uplink to a LEO satellite includes determining position information using a LEO signal received from the LEO satellite, a first ranging signal received from a first ranging source, and a second ranging signal received from a second ranging source; determining a timing advance parameter using a local clock reference and a LEO satellite clock reference; preparing a data uplink signal comprising uplink data to be broadcast to the LEO satellite; synchronizing the data uplink signal with the LEO satellite using the timing advance parameter; and broadcasting the data uplink signal to the LEO satellite.

In accordance with another embodiment of the invention, a data uplink device includes an antenna adapted to: receive a LEO signal from a LEO satellite, receive first and second ranging signals from first and second ranging sources, respectively, and broadcast a data uplink signal to the LEO satellite; and a processor adapted to: determine position information using the LEO signal, the first ranging signal, and the second ranging signal, determine a timing advance parameter using a local clock reference and a LEO satellite clock reference, prepare the data uplink signal comprising uplink data to be broadcast to the LEO satellite, and synchronize the data uplink signal with the LEO satellite using the timing advance parameter.

In accordance with another embodiment of the invention, a data uplink device includes means for determining position information using a LEO signal received from the LEO satellite, a first ranging signal received from a first ranging source, and a second ranging signal received from a second ranging source; means for determining a timing advance parameter using a local clock reference and a LEO satellite clock reference; means for preparing a data uplink signal comprising uplink data to be broadcast to the LEO satellite; means for synchronizing the data uplink signal with the LEO satellite using the timing advance parameter; and means for broadcasting the data uplink signal to the LEO satellite.

In accordance with another embodiment of the invention, a navigation signal comprises at least a portion of a LEO signal provided by a LEO satellite, a method of performing localized jamming of the navigation signal includes filtering a noise source into a plurality of frequency bands to provide a plurality of filtered noise signals in the frequency bands, wherein the navigation signal is spread over a plurality of channels of the LEO signal, wherein the channels are distributed over the frequency bands and a plurality of time slots; generating a PRN sequence corresponding to a modulation sequence used by the LEO satellite to spread the navigation signal over the channels; modulating the filtered noise signals using the PRN sequence to provide a plurality of modulated noise signals; and broadcasting the modulated noise signals over an area of operations to provide a plurality of jamming bursts corresponding to the navigation signal, wherein the jamming bursts are configured to substantially mask the navigation signal in the area of operations.

In accordance with another embodiment of the invention, a navigation signal comprises at least a portion of a LEO signal provided by a LEO satellite, a jamming device configured to perform localized jamming of the navigation signal includes a noise source adapted to provide a noise signal; a plurality of filters adapted to filter the noise signal into a plurality of frequency bands to provide a plurality of filtered noise signals in the frequency bands, wherein the navigation signal is spread over a plurality of channels of the LEO signal, wherein the channels are distributed over the frequency bands and a plurality of time slots; a PRN sequence generator adapted to provide a modulation sequence used by the LEO satellite to spread the navigation signal over the channels; a plurality of oscillators adapted to modulate the filtered noise signals using the PRN sequence to provide a plurality of modulated noise signals; and an antenna adapted to broadcast the modulated noise signals over an area of operations to provide a plurality of jamming bursts corresponding to the navigation signal, wherein the jamming bursts are configured to substantially mask the navigation signal in the area of operations.

In accordance with another embodiment of the invention, a navigation signal comprises at least a portion of a LEO signal provided by a LEO satellite, a jamming device configured to perform localized jamming of the navigation signal includes means for filtering a noise source into a plurality of frequency bands to provide a plurality of filtered noise signals in the frequency bands, wherein the navigation signal is spread over a plurality of channels of the LEO signal, wherein the channels are distributed over the frequency bands and a plurality of time slots; means for generating a PRN sequence corresponding to a modulation sequence used by the LEO satellite to spread the navigation signal over the channels; means for modulating the filtered noise signals using the generated PRN sequence to provide a plurality of modulated noise signals; and means for broadcasting the modulated noise signals over an area of operations to provide a plurality of jamming bursts corresponding to the navigation signal, wherein the jamming bursts are configured to substantially mask the navigation signal in the area of operations.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 15 illustrates a process of constructing uniformly distributed integers of a modulo range from a channel selection pool in accordance with an embodiment of the invention.

FIG. 20 illustrates various state variable definitions used by the navigation processor of FIG. 19 in accordance with an embodiment of the invention.

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments discussed herein, a navigation system employing Low Earth Orbiting (LEO) satellites may be used to implement various navigation signals to provide high integrity navigation. Passive ranging signals from LEO satellites and other non-LEO transmitters (e.g., spaceborne and/or terrestrial), may be integrated into the system.

A reference network of monitor stations may estimate the clock bias, signal structure, and transmitter location or ephemeris of the various platforms from which the passive ranging signals are transmitted. This estimated information (also referred to as calibration information) may be conveyed to various navigation devices through a data link with LEO satellites or other data links.

The navigation devices may be configured to blend the broadcast information and the several different types of signals together to perform high-accuracy navigation. The broadcast LEO signal may be implemented with military, commercial, and civil navigation signals to permit partitioning of users among the different navigation signals and to enable infrastructure cost sharing. An integrated spread spectrum, low probability of intercept and detection (LPI/D) data uplink may also be provided as also described herein.

Figure 1:
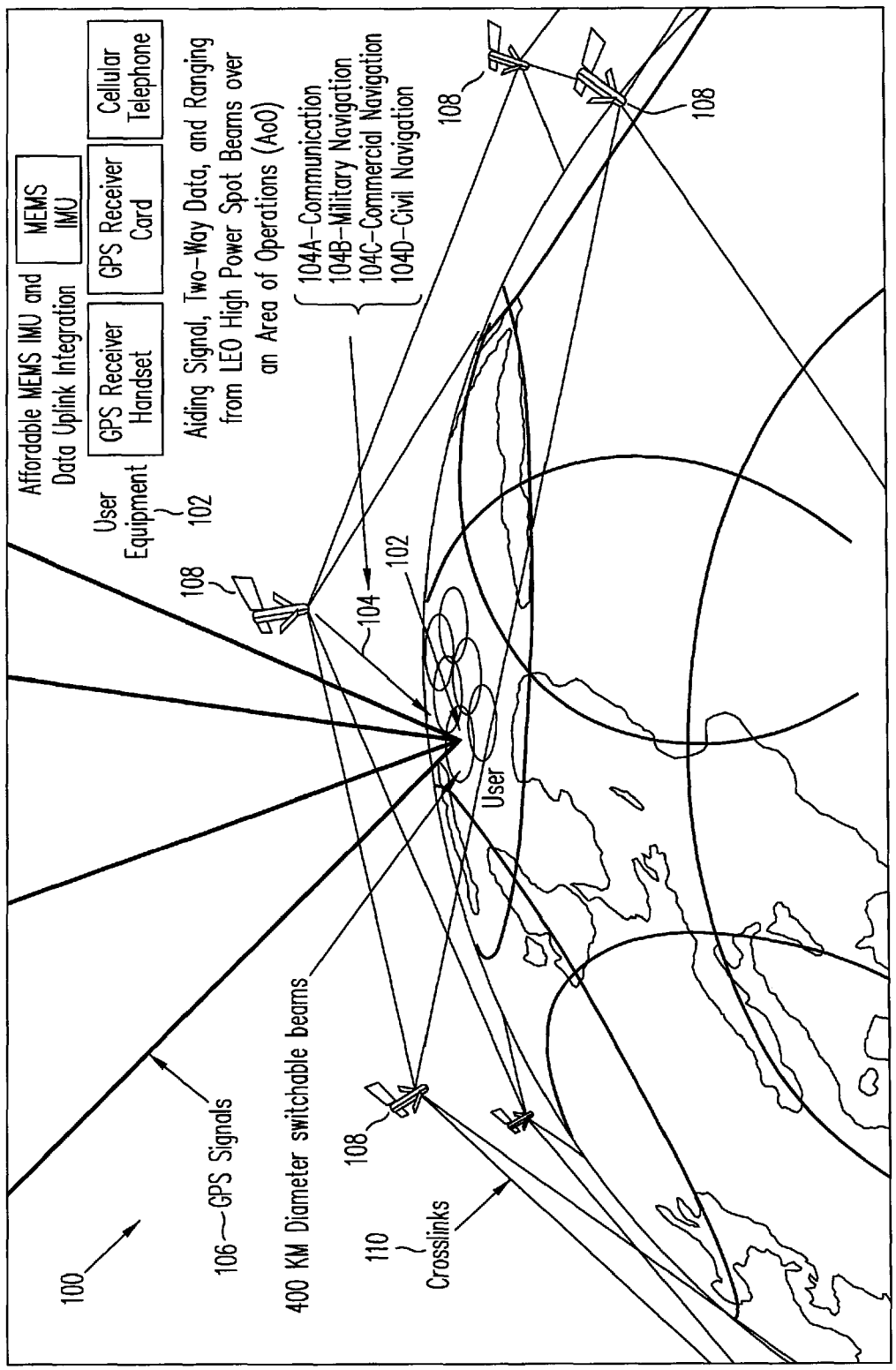
FIG. 1 provides an overview of an integrated high-performance navigation and communication system in accordance with an embodiment of the invention.

Referring now to the figures wherein the showings are for purposes of illustrating embodiments of the present invention only, and not for purposes of limiting the same, FIG. 1 provides an overview of an integrated high-performance navigation and communication system 100 (also referred to as an iGPS system) in accordance with an embodiment of the invention. System 100 may include a navigation device 102 (also referred to as user equipment, a user device and/or a user navigation device) implemented with appropriate hardware and/or software to receive and decode signals from a variety of space and terrestrial ranging sources to perform navigation. Such signals may include, for example, satellite broadcasts from GPS, LEO (e.g., Iridium or Globalstar), Wide Area Augmentation System (WAAS), European Geostationary Navigation Overlay Service (EGNOS), Multi-functional Satellite Augmentation System (MSAS), Galileo, Quasi-Zenith Satellite System (QZSS), and/or Mobile Satellite Ventures (MSV) satellites. Such signals may also include terrestrial broadcasts from cellular towers, TV towers, WiFi, WiMAX, National Vehicle Infrastructure Integration (VII) nodes, and other appropriate sources. In one embodiment, navigation device 102 may be implemented in accordance with various embodiments set forth in U.S. patent application Ser. No. 11/268,317 filed on Nov. 7, 2005 which is incorporated herein by reference In the example shown in FIG. 1, navigation device 102 may be configured to receive global positioning system (GPS) signals 106 (e.g., protected and/or unprotected GPS signals) from conventional navigation satellites. In addition, navigation device 102 may further receive signals 104 from various low earth orbit (LEO) satellites 108. In this regard, each of LEO signals 104 (also referred to as iGPS signals) may be configured as a composite signal including a communication signal 104A, a military navigation signal 104B, a commercial navigation signal 104C, and a civil navigation signal 104D. Such an implementation allows LEO satellites 108 to simultaneously service military, commercial, and civil users, and allows such users to share the costs of operating system 100.

In one example, LEO satellites 108 may be implemented by satellites of an existing communication system (e.g., Iridium or Globalstar) that have been modified and/or reconfigured to support system 100 as described herein. As also shown in FIG. 1, LEO satellites 108 may be implemented to support crosslink signals 110 between the various LEO satellites 108.

Using GPS signals 106 and/or LEO signals 104, navigation device 102 may calculate its position (and accordingly the position of an associated user) to high accuracy. Once determined, the calculated position data (and other data as may be desired) may then be uplinked to LEO satellites 108 using a spread spectrum data uplink described herein.

Navigation device 102 may be further configured to receive and perform navigation using broadcasts of other space and terrestrial ranging sources as may be desired in particular embodiments. In addition, navigation device 102 may be configured with an inertial measurement unit (IMU) implemented, for example, as a microelectromechanical system (MEMS) device to provide jamming protection as described herein.

Navigation device 102 may be implemented in any desired configuration as may be appropriate for particular applications. For example, in various embodiments, navigation device 102 may be implemented as a handheld navigation device, a vehicle-based navigation device, an aircraft-based navigation device, or other type of device.

Figure 2:
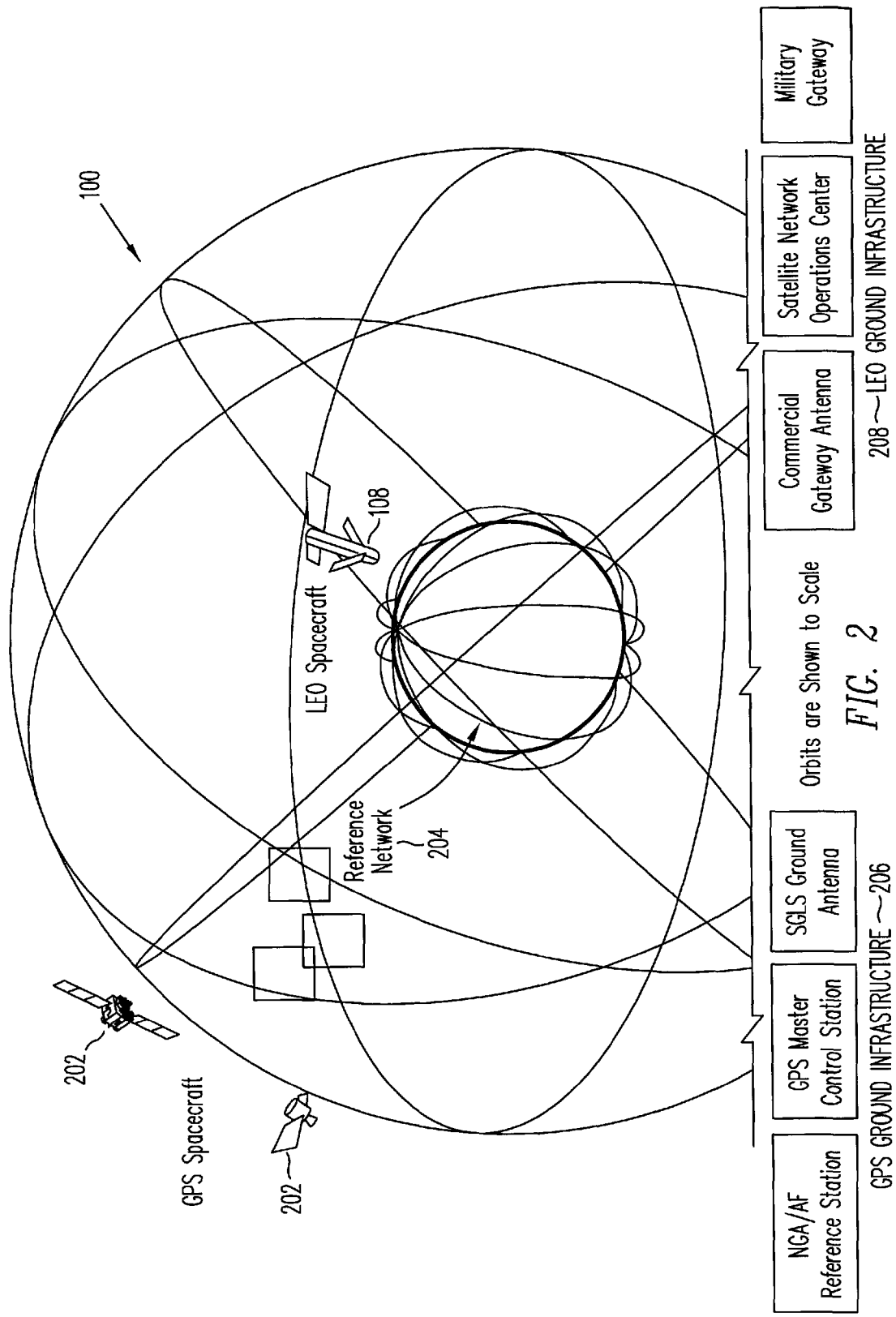
FIG. 2 provides a further overview of the system of FIG. 1 in accordance with an embodiment of the invention.

FIG. 2 provides a further overview of system 100 in accordance with an embodiment of the invention. In particular, FIG. 2 illustrates LEO satellites 108 and GPS satellites 202 in orbit around the earth. FIG. 2 further illustrates various aspects of infrastructure subsystems of system 100. For example, system 100 may include a reference network 204 configured to receive LEO signals 104 or other ranging signals, GPS ground infrastructure 206, and LEO ground infrastructure 208. It will be appreciated that additional spaceborne and/or terrestrial components may also be provided in various embodiments of system 100.

Figure 3:
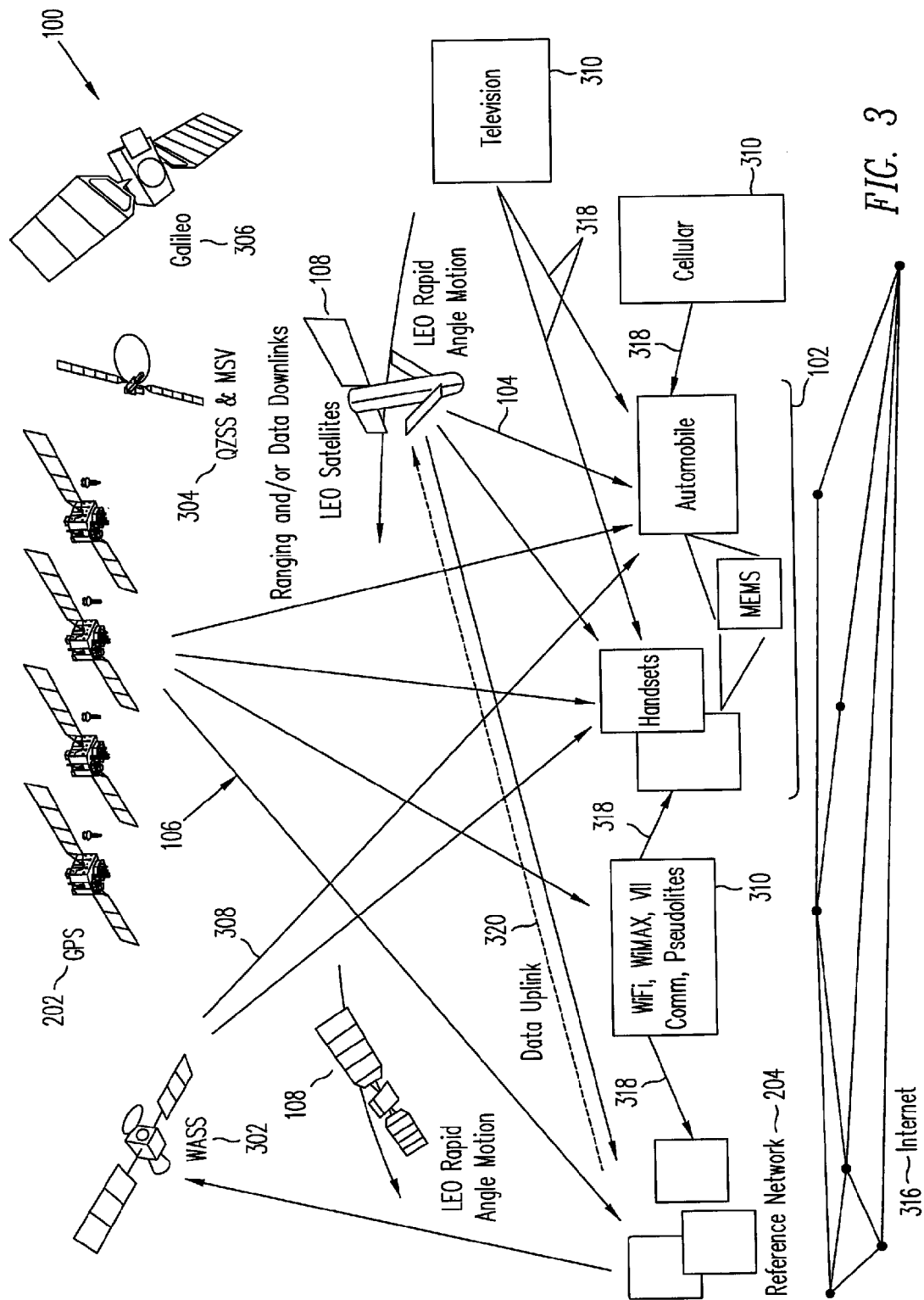
FIG. 3 illustrates an overall operational configuration of the system of FIG. 1 in accordance with an embodiment of the invention.

FIG. 3 illustrates an overall operational configuration of system 100 in accordance with an embodiment of the invention. It will be appreciated that although a variety of subsystems are illustrated in FIG. 3, all of such subsystems need not be provided in all embodiments of system 100.

As shown in FIG. 3, LEO satellites 108 exhibit rapid angle motion relative to navigation devices 102 and various illustrated terrestrial subsystems. Advantageously, this rapid angle motion can aid the terrestrial subsystems in solving for cycle ambiguities. In addition, LEO signals 104 may be implemented with high power relative to conventional navigation signals 106. As such, LEO signals 104 may also enable penetration through interference or buildings.

LEO signals 104 may include a ranging and data link to the various ground terminals. As shown in FIG. 3, such terminals may include a geographically diverse reference network 204 and navigation devices 102 (illustrated in this example as a cell phone handset, MEMS device, and an automobile).

A variety of satellites are also illustrated, including GPS satellites 202, Galileo satellites 306, WAAS satellites 302, and QZSS/MSV 304 satellites, any of which may be configured to broadcast ranging and data downlinks to reference network 204 and navigation devices 102 in accordance with various embodiments.

It will be appreciated that for purposes of clarity, some ranging signals are not shown in FIG. 3. For example, in one embodiment, all of the illustrated satellites may be configured to broadcast to all of navigation devices 102 and reference network 204.

As also shown in FIG. 3, a variety of ranging signals 318 from a plurality of ranging signal sources 310 may be monitored by reference network 204 and navigation devices 102. Reference network 204 may be configured to characterize each ranging signal source 310 to provide calibration information associated with each ranging signal source. Such information may be passed to LEO satellite 108 over an appropriate data uplink 320, encoded by LEO satellite 108 into one or more of military, commercial, or navigation signals 104B/104C/104D of LEO signal 104, and broadcast to navigation devices 102 as part of LEO signal 104. The calibration information can then be used by navigation devices 102 to interpret ranging signals 318 in order to perform navigation in combination with a ranging measurement performed using LEO signal 104.

In general, a variety of transmitters can provide timing and (and therefore ranging) data. In this regard, for a generalized ranging source, its associated ranging signal may be received by reference network 204 and navigation devices 102. Reference network 204 may determine calibration information associated with the ranging signal, and telemeter such calibration information to navigation devices 102 through a data uplink with LEO satellites 108 and/or through terrestrial links to navigation devices.

For example, FIG. 3, illustrates GPS signals 106 being received by one of ranging signal sources 310 implemented as a WiFi node. If the capability to measure the timing (equivalent to range if multiplied by the speed of light) of pre-defined attributes of a WiFi signal is implemented within a GPS receiver, the receiver can measure the received WiFi and GPS signal times concurrently. The difference between these quantities can be calculated, time tagged, and transferred to reference network 204 to provide calibration information associated with the WiFi node. Additional calibration information may be determined by reference network 204 in response to receiving GPS signals 106 and other types of ranging signals 318. In each case, reference network 204 may telemeter real-time calibration information associated with the WiFi node to navigation devices 102 through LEO satellite 104 over uplink 320 and LEO signal 104 (e.g., over space-based links). Calibration information may also be provided to navigation devices 102 over terrestrial links. Advantageously, each ranging signal source 310 does not necessarily need to be in view of all nodes of reference network 204 if a network 316 (e.g., the Internet) is present between the various terrestrial nodes.

As discussed, LEO satellites 108 may be implemented as communication satellites (for example, Iridium or Globalstar satellites) that have been modified and/or reconfigured as described herein to support navigation features of system 100. Tables 1 and 2 below identify various attributes of Iridium and Globalstar communication satellites, respectively, that may be used as LEO satellites 108 in accordance with various embodiments:

TABLE 1

Based on GSM Cell Phone Architecture
Both FDMA and TDMA
41.667 kHz channel divisions
10.5 MHz downlink allocation
40% Root Raised Cosine QPSK modulation at 25,000 sps
90 ms frame
Time Slots: (1) simplex down, (4) 8.28 ms duplex up, (4) 8.28 ms duplex down

TABLE 2

Based on CDMA IS-95 Cell Phone Architecture
Both FDMA and CDMA
1.25 MHz channel divisions
16.5 MHz downlink allocation
Bent-Pipe Transponder In one example where Iridium communication satellites are used to implement LEO satellites 108, flight computers of the Iridium communication satellites can be reprogrammed with appropriate software to facilitate the handling of navigation signals. In another example where Globalstar communication satellites are used to implement LEO satellites 108, the satellite bent pipe architecture enables ground equipment to be upgraded to enable a variety of new signal formats.

In embodiments where LEO satellites 108 are implemented using communication satellites, the communication satellites may be configured to support communication signals as well as navigation signals. In this regard, such navigation signals may be implemented to account for various factors such as multipath rejection, ranging accuracy, cross-correlation, resistance to jamming and interference, and security, including selective access, anti-spoofing, and low probability of interception.

Figure 4:
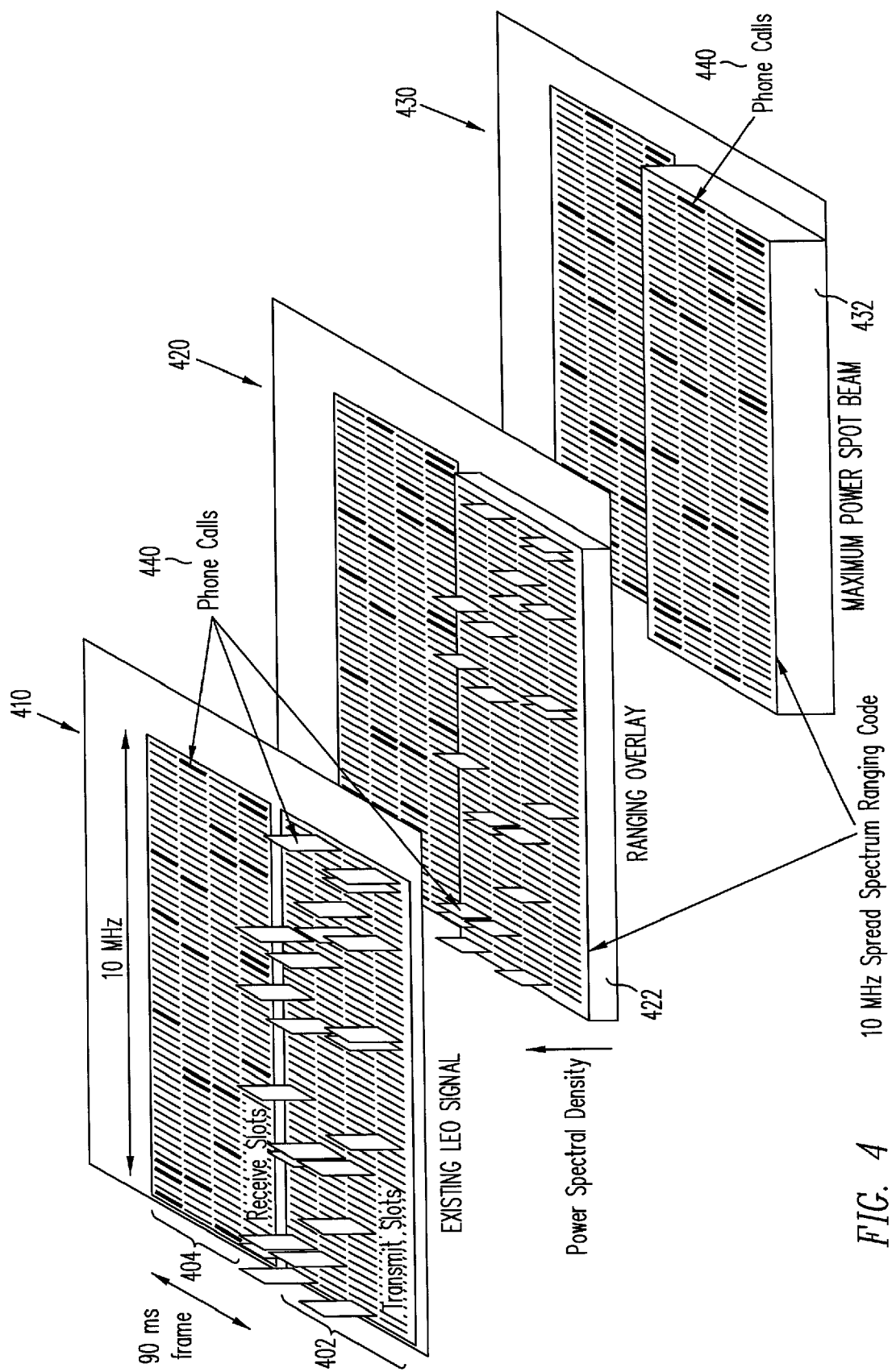
FIG. 4 illustrates an approach for implementing low earth orbit signals in accordance with an embodiment of the invention.

FIG. 4 illustrates an approach for implementing LEO signals 104 in accordance with an embodiment of the invention. In particular, blocks 410, 420, and 430 of FIG. 4 illustrate the structure of signals transmitted and received by LEO satellites 108 to provide support for communication and navigation signals, where LEO satellites 108 are implemented using existing Iridium communication satellites. In blocks 410, 420, and 430, frequency is shown in the horizontal axis, time is shown in and out of the page, and power spectral density is shown in the vertical axis.

In one embodiment, LEO satellite 108 may be configured to support a plurality of channels implemented as a plurality of transmit slots 402 and a plurality of receive slots 404 configured in a time division multiple access (TDMA) fashion over a 90 ms frame width, and further configured in a frequency division multiple access (FDMA) fashion over a 10 MHz frequency bandwidth. In this regard, it will be appreciated that each channel may correspond to a particular transmit or receive slot of a frame provided in a particular frequency band. For example, in one embodiment, LEO satellite 108 may be implemented to support the transmission of approximately 960 channels, with 240 frequency bands providing 4 time slots per frame (e.g., 240 frequency bands×4 time slots=960 channels).

As shown in block 410, some of the transmit slots 402 and receive slots 404 may be associated with existing communications (e.g., shown in FIG. 4 as telephone calls 440). The used transmit slots 402 may correspond to the data provided over communication signal 104A of LEO signal 104 transmitted by LEO satellite 108.

It will be appreciated that in the embodiment shown in block 410, a plurality of transmit slots 402 remain unused. In accordance with various embodiments of the invention, the unused communication capacity of unused transmit slots 402 may be leveraged to support navigation signals as described herein.

As shown in block 420, a ranging overlay 422 of pseudo random noise (PRN) may be introduced in each of the remaining unused transmit slots 402. Ranging overlay 422 can be run at low average power on a channel-by-channel basis, but with the aggregate ranging overlay 422 exhibiting high power to overcome jamming. In contrast, block 430 shows ranging overlay 422 implemented using a maximum power spot beam provided by LEO satellite 108.

In one embodiment, ranging overlay 422 may be implemented using a combination of frequency hopping and direct sequence PRN. For the frequency hopping component, a subset of frequencies may be chosen on a pseudo-random basis each burst. Then, within each burst, the data bits are also chosen on a pseudo-random basis.

In one embodiment, telephone calls 440 may be given priority in transmit slots 402 over ranging overlay 422, with ranging overlay 422 being little affected by occasional missing or corrupted bursts. In another embodiment, ranging overlay 422 may be given priority in transmit slots 402 over telephone calls 440, with telephone calls 440 similarly being little affected by occasional missing or corrupted bursts.

In one embodiment, ranging overlay 422 may be implemented with as wide a bandwidth as possible subject to spectrum regulations. In this case, all available channels may be used, and various methods of frequency, time, and code division multiple access (CDMA) may be employed to create a downlink signal that tends to look like flat white noise unless the user knows the code. The flatness provides a signal that is well suited for accuracy, jam resistance, and multipath rejection. Cross correlation can be minimized by using an appropriate encryption algorithm made possible by fast digital signal processing in navigation device 102.

In one embodiment, LEO signal 104 may be implemented as a complex signal s(t) versus time t as shown in the following equation:

$$s(t) = A \sum_n \sum_{m=1}^N p_{nm} h(t - nT) e^{j2\pi f_0 (m-1)t/N}$$

In the above equation, A is the signal amplitude, n is the symbol index, p is the direct-sequence pseudo-random noise value given as ±1, h is the symbol impulse response, m is the channel frequency index, f0 is the spread spectrum broadcast span, and N is the number of channel frequencies forming the spread spectrum broadcast span.

In another embodiment where LEO satellites 108 are implemented by Globalstar satellites, a low-power direct-sequence code may be provided on each of the 1.25 MHz channels that is orthogonal to telephony traffic.

Figure 5:
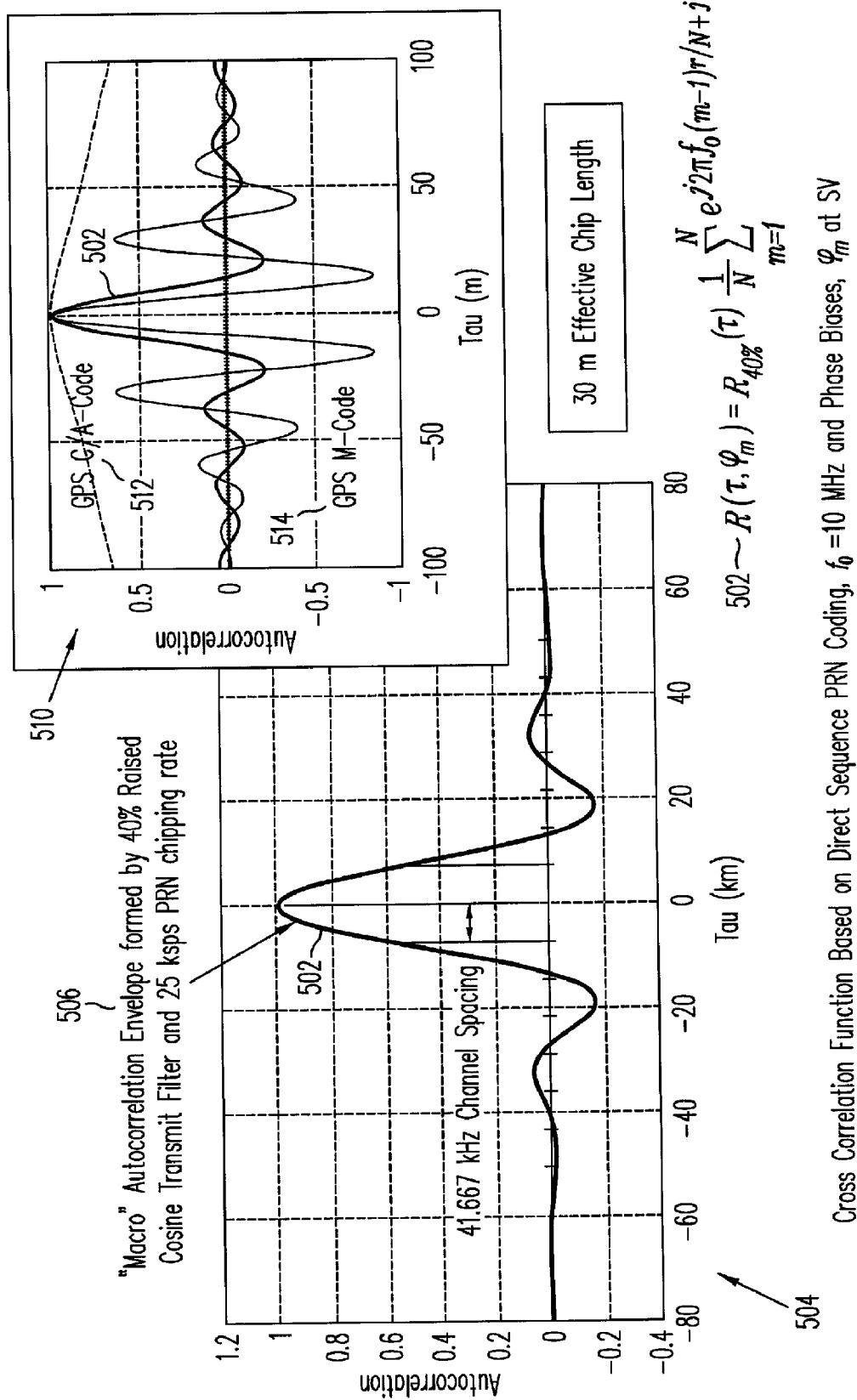
FIG. 5 illustrates an autocorrelation function associated with low earth orbit signals in accordance with an embodiment of the invention.

FIG. 5 illustrates an autocorrelation function 502 that may be implemented by navigation device 102 to lock on to LEO signal 104 in accordance with an embodiment of the invention. In FIG. 5, τ is the autocorrelation argument, R is the autocorrelation function of the basic 40% root raised cosine symbol impulse response, N is the number of channels allowable by LEO satellite's 108 spectrum allocation (e.g., a maximum of 240 in one embodiment), $f_0$ is the allowable frequency span (related to N by the channel spacing such that $f_0$=[41.667 kHz]N in one embodiment), and $\phi_m$ is the satellite phase bias for each channel.

In addition, FIG. 5 provides plots 504 and 510 of autocorrelation function 502 using different scales. In plot 504, an envelope 506 of autocorrelation function 502 is shown as being formed by the effective correlation length of the 25 ksps direct sequence data. In this embodiment, autocorrelation is formed by the aggregation of the broadband channels separated by 41.667 kHz. For example, for a 10 MHz wide broadcast, the effective direct sequence chip length may be that of Y code, namely 30 m. For comparison, an example GPS coarse/acquisition (C/A) code 512 and an example GPS military (M) code 514 are also shown superimposed on plot 510. As shown in plot 510, the side lobes of autocorrelation function 502 are as readily manageable as those for GPS M-code 514. In this regard, the side lobes of autocorrelation function 502 are either highly attenuated or clearly distinguishable.

As previously described, LEO signal 104 may include various navigation signals including military navigation signal 104B, commercial navigation signal 104C, and civil navigation signal 104D. As such, navigation devices 102 may be configured to decode one or more of these signals to perform navigation.

Figure 6:
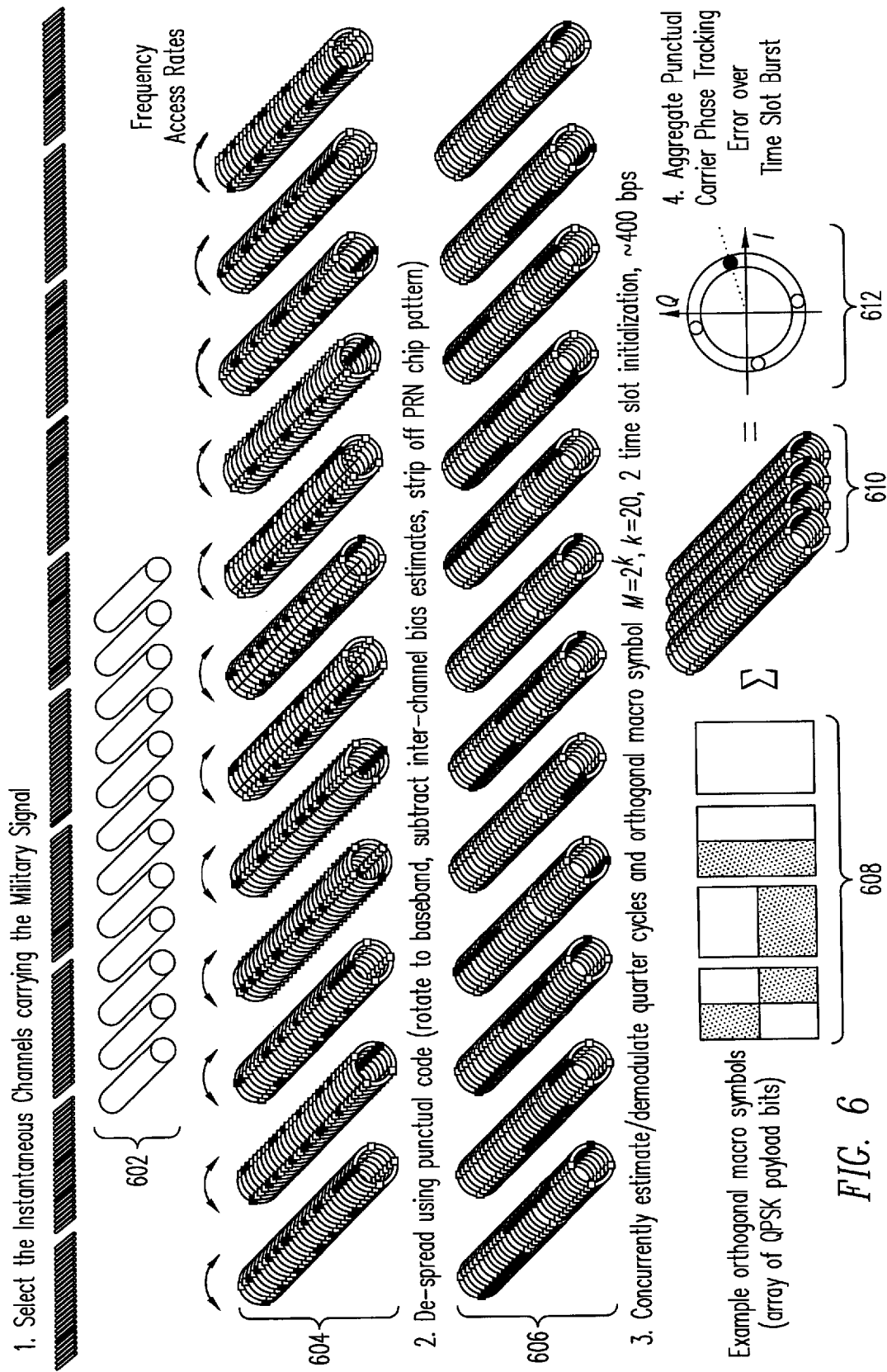
FIG. 6 illustrates a process of decoding a military navigation component of a low earth orbit signal in accordance with an embodiment of the invention.

For example, FIG. 6 illustrates a process of decoding military navigation signal 104B of LEO signal 104 in accordance with an embodiment of the invention. It will be appreciated that the process of FIG. 6 may be performed by navigation device 102 in response to receiving LEO signal 104.

In various applications, it is desirable to implement military navigation signal 104B as a high power signal to overcome possible jamming. Accordingly, as shown in step 1 of FIG. 6, LEO signal 104 may include several parallel channels 602 (shown as 12 channels in FIG. 6) configured to carry military navigation signal 104B. In one embodiment, a pseudo-random process may be used to determine the particular channels 602 activated for each broadcast burst from LEO satellites 108. Also shown in step of FIG. 6, a string of quadrature phase-shift key (QPSK) symbols 604 are illustrated for each parallel burst on channels 602, with time going into the page. QPSK symbols 604 are modulated with the PRN direct sequence encoding and also exhibit bias and rotation based on their frequency offset in LEO signal 104.

In step 2 of FIG. 6, the PRN encoding is despread by rotating each burst to baseband, subtracting off inter-channel bias, and stripping off the PRN direct sequence pattern to provide a set of bursts carrying data associated with military navigation signal 104B, as represented by modified QPSK symbols 606.

In step 3 of FIG. 6, low-bit rate data is demodulated according to a set of M possible orthogonal macro symbols 608. If quarter cycle ambiguities from the QPSK modulation are present, the combined ambiguities and macro symbols may not be perfectly orthogonal. Once the data is estimated, a hard decision algorithm strips off the estimated data leaving only unmodulated carrier 610.

In step 4 of FIG. 6, the carrier is averaged over the entire burst and then over each channel. As a result, an in phase and quadrature measurement 612 of the instantaneous tracking error can be provided. A phase locked loop (PLL) of navigation device 102 is then used to track the satellite carrier.

Figure 7:
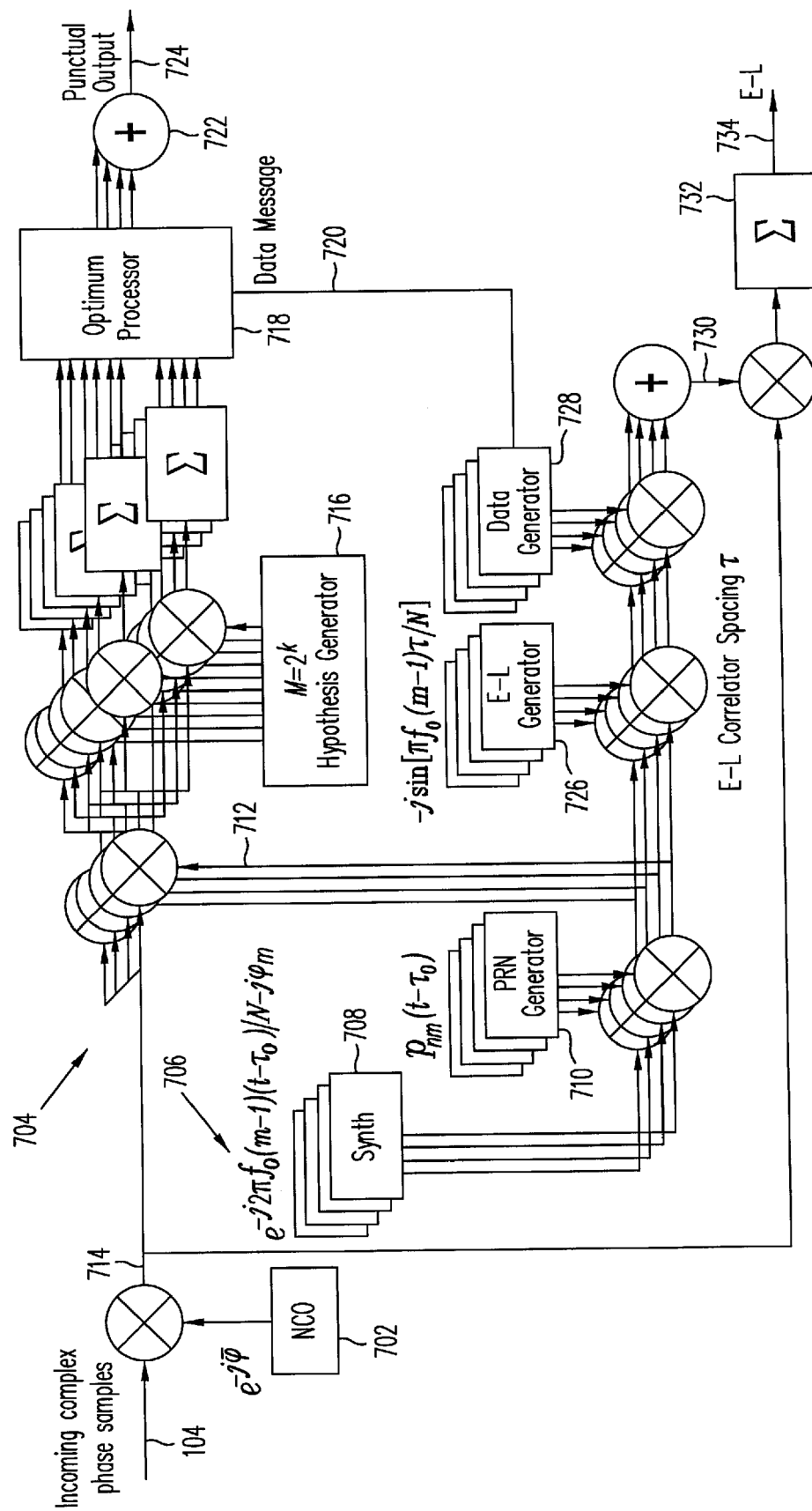
FIG. 7 illustrates a block diagram of a correlator of a navigation device in accordance with an embodiment of the invention.

FIG. 7 illustrates a block diagram of a correlator of navigation device 102 that may be used to perform the process of FIG. 6 in accordance with an embodiment of the invention. A numerically controlled oscillator 702 generates a carrier that downconverts the incoming LEO signal 104 (e.g., received through an antenna of navigation device 102) to a baseband signal 714. Baseband signal 714 is provided to an upper path 704 that performs punctual code carrier tracking. Baseband signal 714 is also provided to a lower path 706 that performs early minus late detection.

In lower path 706, a bank of synthesizers 708 and PRN generators 710 replicate each channel of LEO signal 104. In upper path 704, replicated signals 712 are mixed with baseband signal 714 to remove all code and phase rotation for each channel separately. A hypothesis generator 716 computes the signal associated with each of the possible macro symbols 608 and quarter cycle ambiguities, if any. A processor 718 uses a maximum a posteriori (MAP) algorithm to provide a data estimate 720 identifying which of the macro symbol hypotheses is most likely. As shown, data estimate 720 is passed to lower path 706 for use in early minus late detection. To perform punctual detection in upper path 704, processor 718 strips off the data and outputs the resulting bursts to summing block 722 that integrates the aggregate bursts over time to arrive at the in phase and quadrature tracking error 724.

In lower path 706, replicated signals 712 are further modulated by an early minus late block 726 and a data generator block 728 (using data estimate 720 received from upper path 704). As shown, the resulting modulated signals are summed together to form a composite early minus late replica signal 730 that is mixed with baseband signal 714 and sent to summing block 732 for time averaging to provide an early minus late discriminator 734. Accordingly, given carrier lock and a sufficient averaging interval, early minus late discriminator 734 provides a measure of the instantaneous tracking error.

Figure 8:
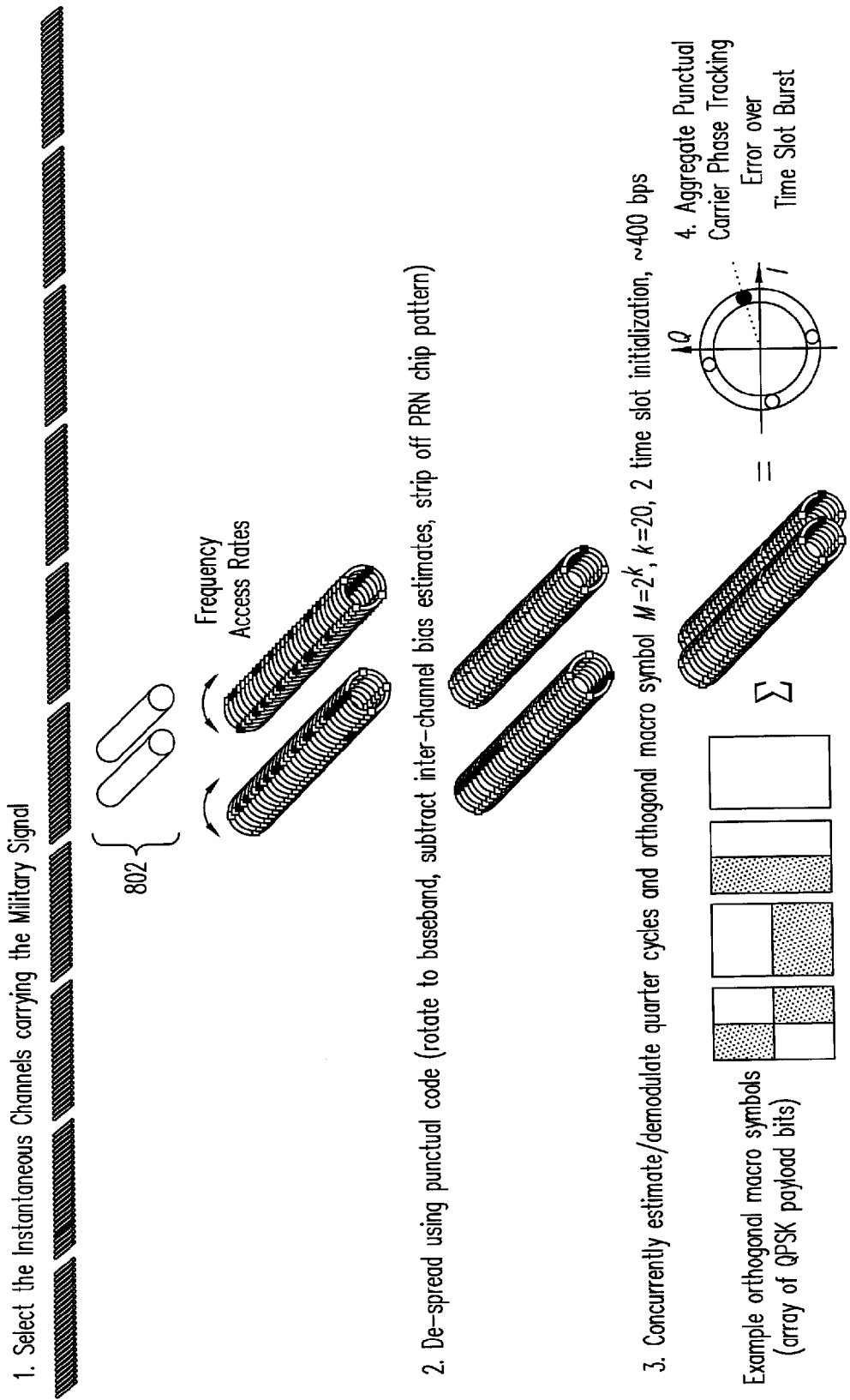
FIG. 8 illustrates a process of decoding a commercial navigation component of a low earth orbit signal in accordance with an embodiment of the invention.

FIG. 8 illustrates a process of decoding commercial navigation signal 104C of LEO signal 104 in accordance with an embodiment of the invention. It will be appreciated that the process of FIG. 8 may be performed by navigation device 102 in response to receiving LEO signal 104.

As shown, the process of FIG. 8 is similar to the process of FIG. 6, with steps 1-4 of FIG. 8 generally corresponding to steps 1-4 of FIG. 6. However, it will be appreciated that in the process of FIG. 8, fewer channels 802 (e.g., 2 channels in the illustrated embodiment) are used in comparison with channels 602 of FIG. 6. Because of the fewer number of channels 802 used, commercial navigation signal 104C of LEO signal 104 may be implemented with lower power and lower bandwidth than military navigation signal 104B.

Figure 9:
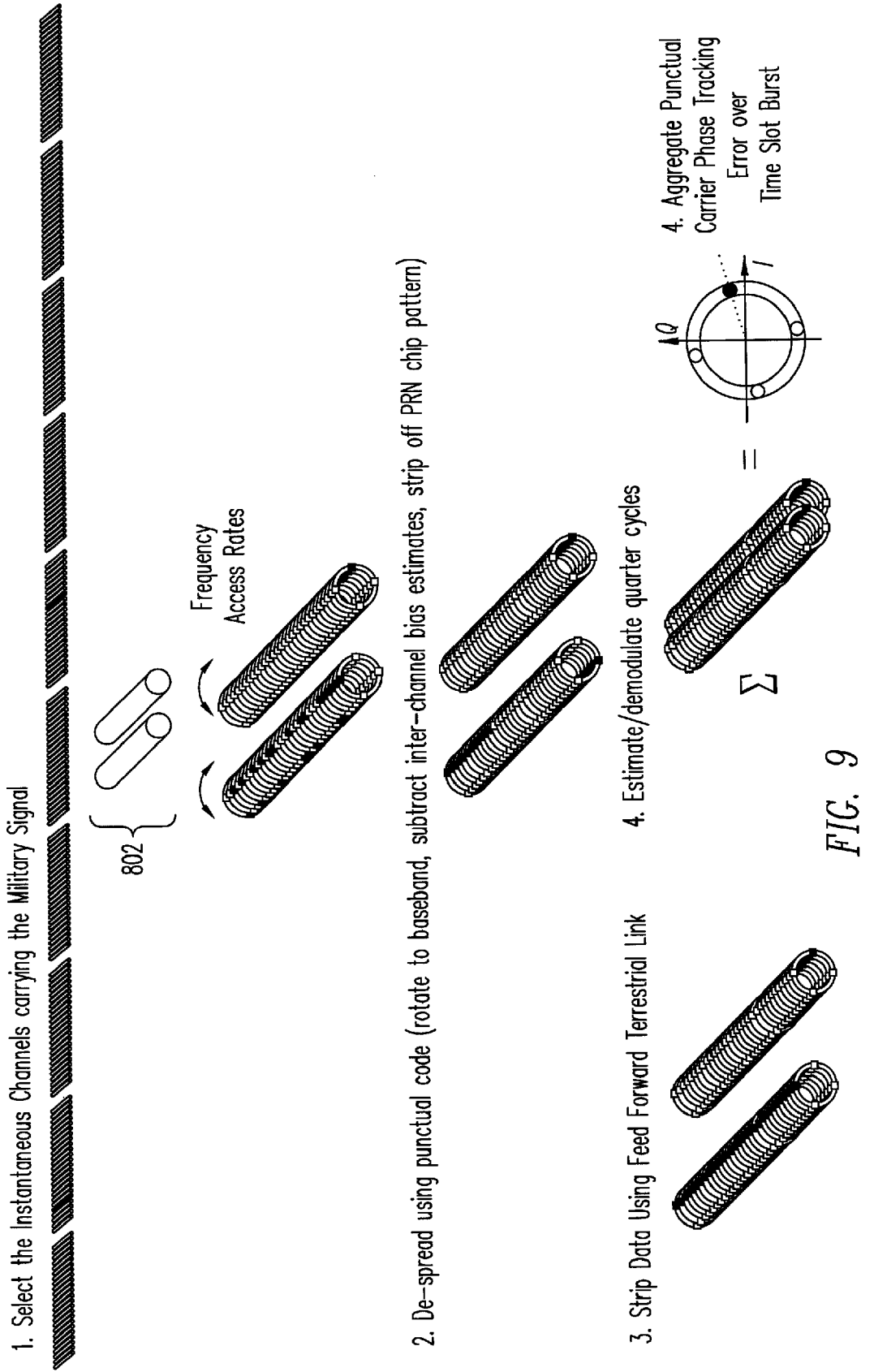
FIG. 9 illustrates an alternate process of decoding a commercial navigation component of a low earth orbit signal in accordance with an embodiment of the invention.

FIG. 9 illustrates an alternate process of decoding commercial navigation signal 104C of LEO signal 104 in accordance with an embodiment of the invention. As shown, the process of FIG. 9 is similar to the process of FIG. 8, with steps 1-2 of FIG. 9 generally corresponding to steps 1-2 of FIG. 8. However, in step 3 of FIG. 9, it is assumed that downlink data (e.g., calibration information) can be received by a navigation device 102 in a manner other than LEO signal 104 (for example, from a link to reference network 204 or one or more of nodes 310 shown in FIG. 3). Further processing can then be performed in steps 4 and 5 of FIG. 9, similar to steps 3 and 4 of FIG. 8, respectively. Advantageously, the insertion of step 3 in the process of FIG. 9 can provide higher sensitivity in indoor environments. In this regard, navigation device 102 can receive a reliable representation of downlink data from one or more reference stations of reference network 204, without requiring navigation device 102 to perform downlink data and/or quarter cycle stripping, thereby reducing the processing required by navigation device 102 and improving signal processing gain.

Figure 10:
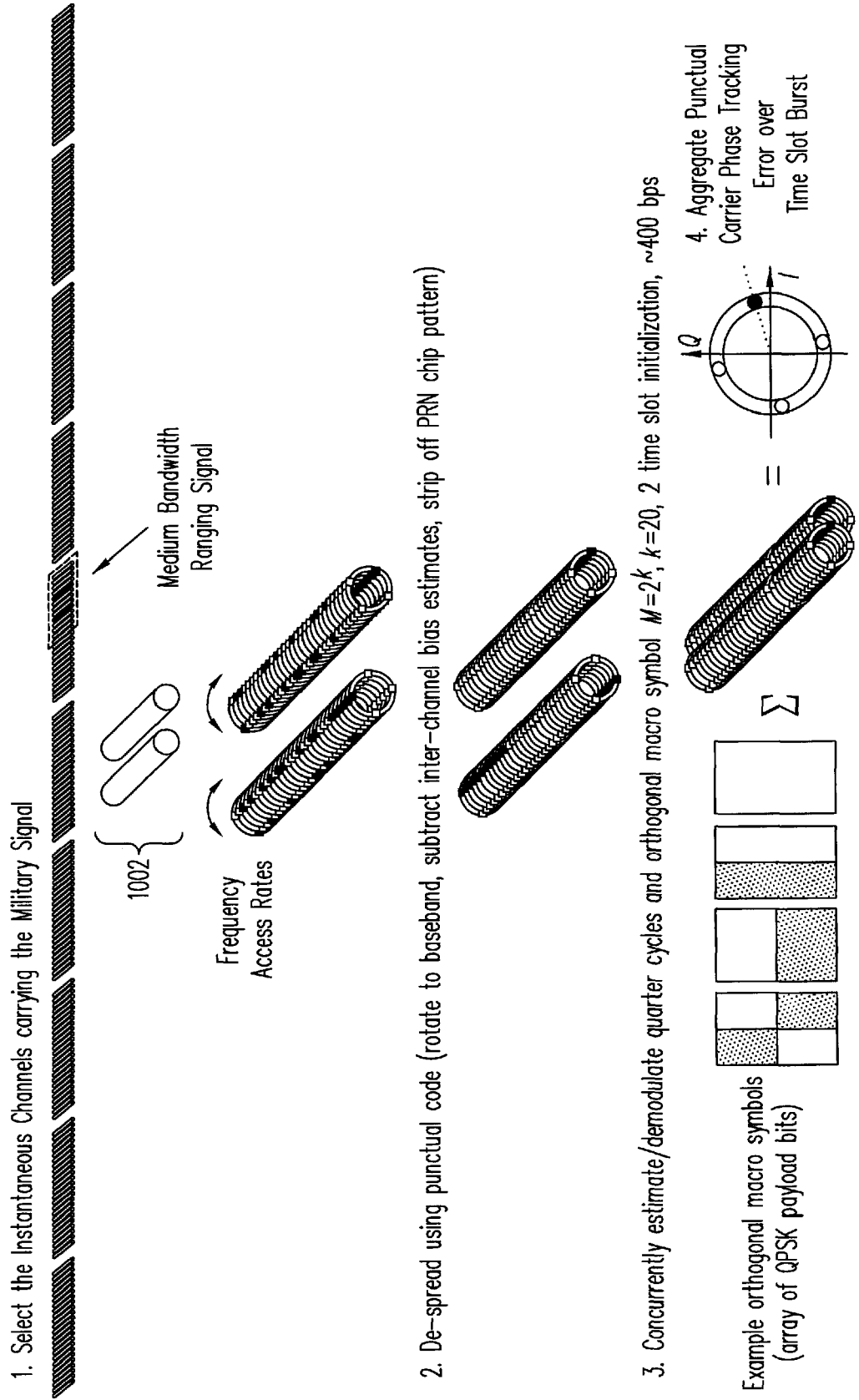
FIG. 10 illustrates a process of decoding a civil navigation component of a low earth orbit signal in accordance with an embodiment of the invention.

FIG. 10 illustrates a process of decoding civil navigation signal 104D of LEO signal 104 in accordance with an embodiment of the invention. In various embodiments, the use of civil navigation signal 104D may be generally focused on carrier-only navigation. As a result, civil navigation signal 104D may be implemented with relatively narrow bandwidth (for example, approximately 1 MHz) and may be publicly known. As such, channels 1002 used for civil navigation signal 104D may be implemented without significant spectrum spread. In this regard, it will be appreciated that channels 1002 illustrated in step 1 of FIG. 10 are closely grouped in comparison with channels 602 and 802 illustrated in step 1 of each of FIGS. 6, 8, and 9. It will be appreciated that the operation of steps 1-4 of FIG. 10 will be understood from the operation steps 1-4 of FIG. 6 previously discussed.

In view of the above discussion, it will be appreciated that in certain embodiments military, commercial, and civil navigation signals 104B, 104C, and 104D of LEO signal 104 may be implemented with the following attributes identified in the following Table 3:

TABLE 3

| Signal | Power | Bandwidth |
|---|---|---|
| Military | Maximum | Maximum |
| Commercial | Moderate | High |
| Civil | Moderate | Moderate |

In another embodiment of the invention, system 100 can be implemented to permit military use of military navigation signal 104B while simultaneously denying use of commercial and/or civil navigation signals 104C and 104D to adversaries in a particular area of operations, without compromising use of commercial and civil navigation signals 104C and 104D outside the area of operations.

For example, in one embodiment, the decoding of commercial navigation signal 104C may be conditioned on the use of a distributed encryption key that may be permitted to expire over the area of operations. In another embodiment, the broadcasting of commercial navigation signal 104C by LEO satellites 108 may be selectively interrupted over the area of operations (for example, individual spot beams from LEO satellites 108 may be independently turned off).

In another embodiment, commercial navigation signal 104C and/or civil navigation signal 104D may be locally jammed within the area of operations. In this regard, FIG. 11 illustrates a comparison between military navigation signal 104B, civil navigation signal 104D, and GPS C/A code 512, and GPS M-code 514.

Figure 11:
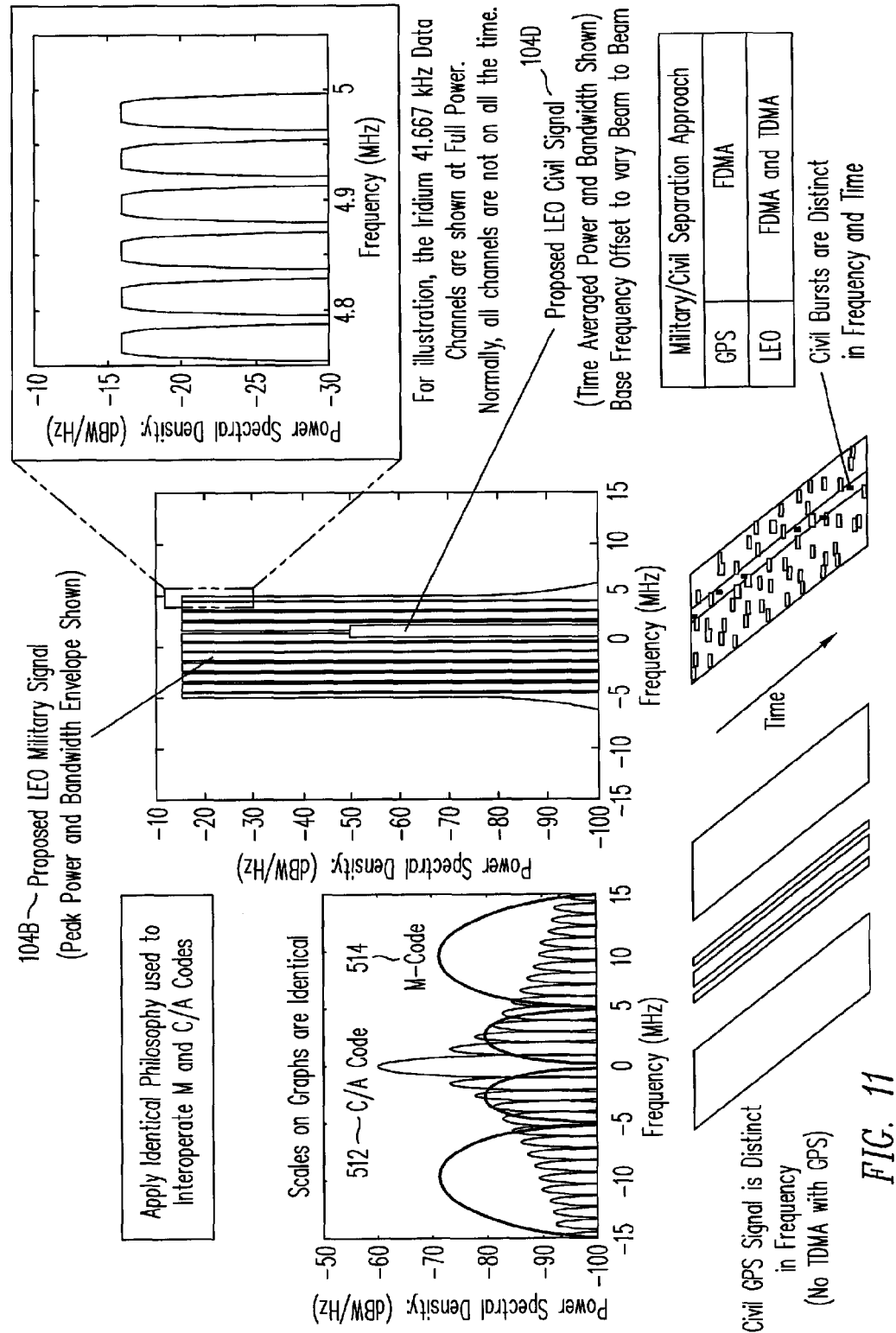
FIG. 11 illustrates a comparison between navigation components of a low earth orbit signal and GPS codes in accordance with an embodiment of the invention.

As shown in FIG. 11, GPS C/A code 512 can be jammed for military purposes by jamming the C/A code band. As also shown in FIG. 11, civil navigation signal 104D can be viewed as a subset of military navigation signal 104B in both power spectral density and bandwidth. If ranging overlay 422 is implemented using both FDMA and TDMA, it can be seen that civil navigation signal 104D is manifested in frequency hopping bursts as shown in FIG. 11.

Figure 12:
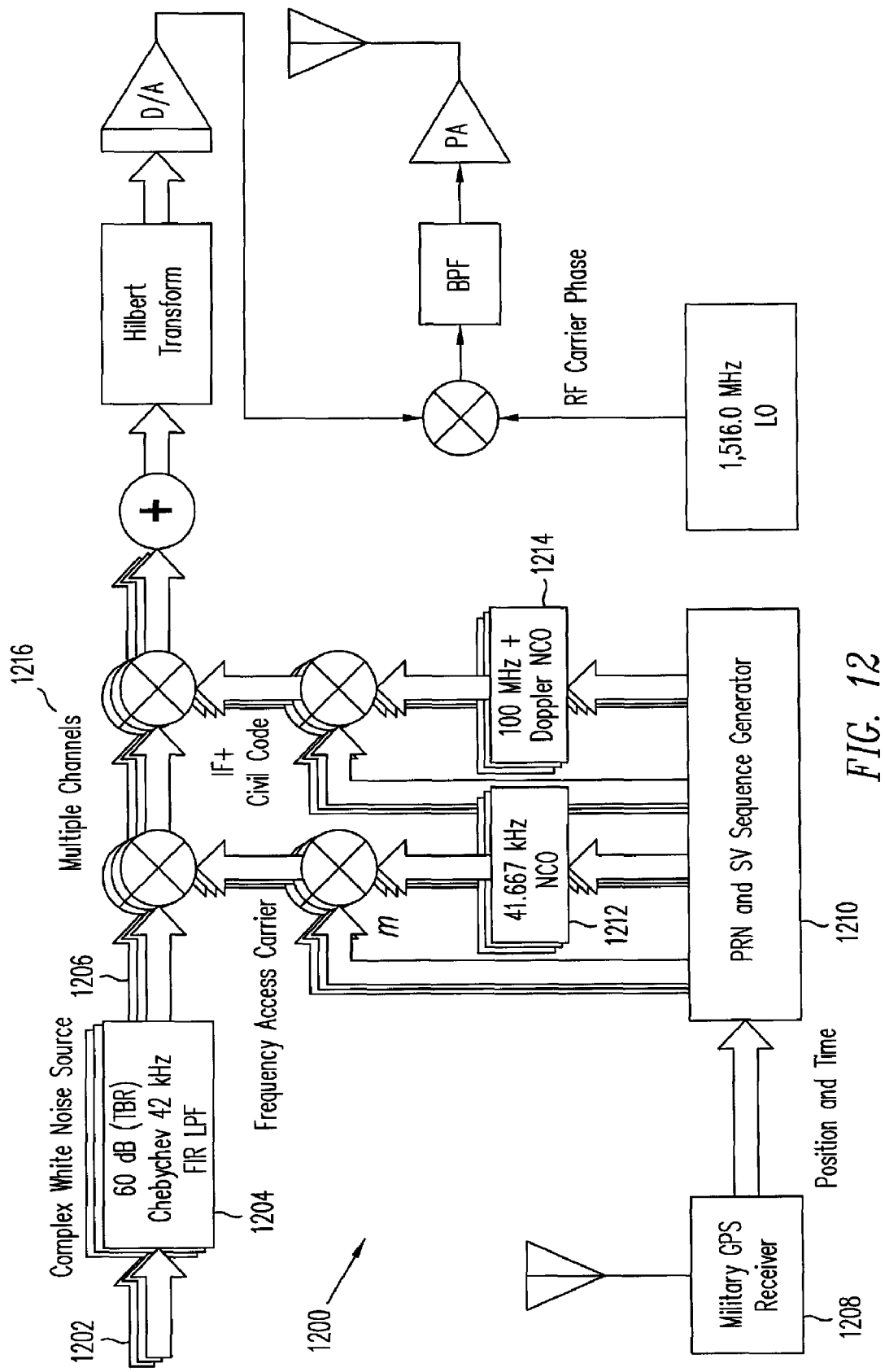
FIG. 12 illustrates a block diagram of a jamming device that may be used to perform localized jamming of navigation signals in accordance with an embodiment of the invention.

FIG. 12 illustrates a block diagram of a jamming device 1200 that may be used to perform localized jamming of civil and commercial navigation signals 104C and 104D in accordance with an embodiment of the invention. As shown in FIG. 12, a white noise source 1202 (for example, created using Brownian motion) is processed by a filter 1204 to provide a noise signal 1206 having a bandwidth corresponding approximately to a transmission channel of LEO satellite 108.

A military receiver device 1208, generator 1210, and oscillators 1212/1214 are configured to provide multiple channels 1216 corresponding to the instantaneous frequency of civil navigation signal 104D as determined by a predefined, published civil PRN sequence. Channels 1216 are used to modulate noise signal 1206 which is then upconverted using additional illustrated components to emit jamming bursts at precisely the times, durations, and frequencies of civil navigation signal 104D received from LEO satellites 108 as part of LEO signal 104. It will be appreciated that the above approach can also be used to provide jamming of commercial navigation signal 104C as may be desired in particular implementations.

Figure 13:
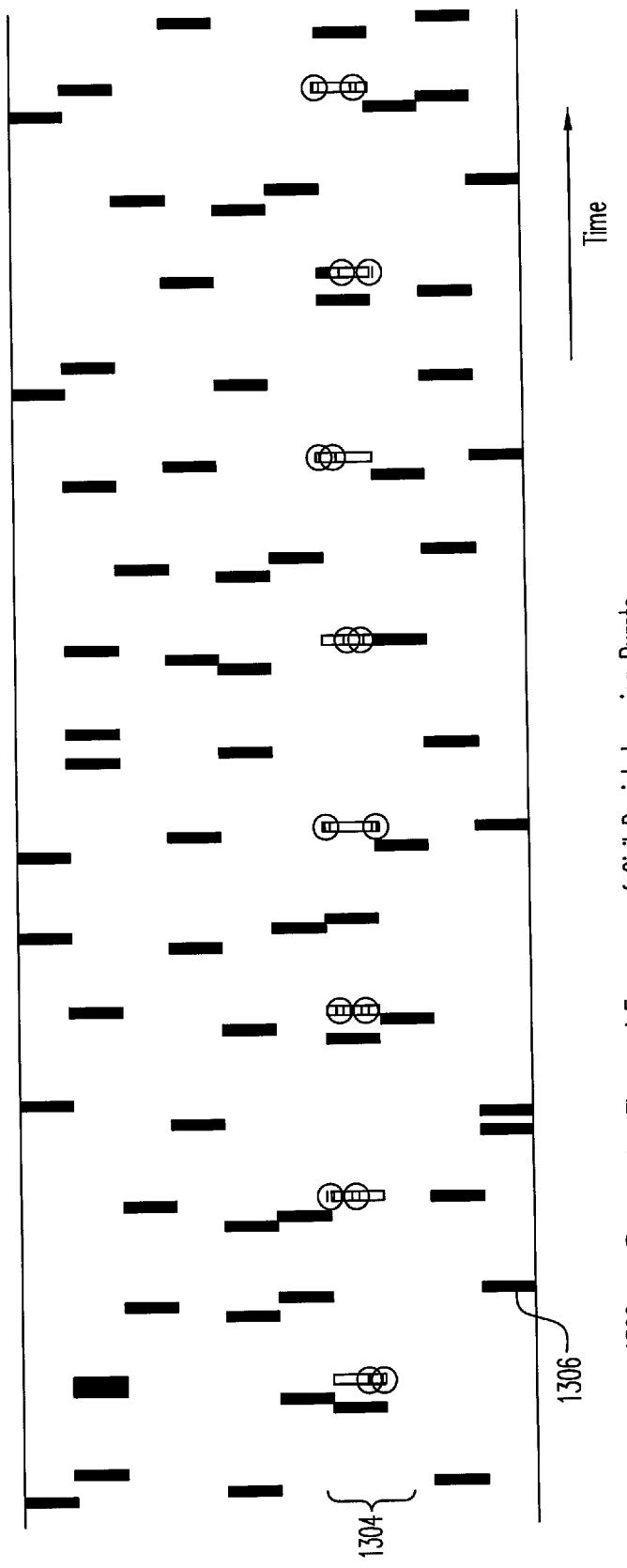
FIG. 13 provides a frequency and time domain representation of the operation of the jamming device of FIG. 12 in accordance with an embodiment of the invention.

FIG. 13 provides a frequency and time domain representation of the operation of the jamming device of FIG. 12 in accordance with an embodiment of the invention. As shown in FIG. 13, individual noise bursts 1302 provided by jamming device 1200 are focused in a narrow frequency band 1304 corresponding to civil navigation signal 104D. Advantageously, military navigation signal 104B components (represented by dark rectangles 1306) is effectively unchanged and is fully available for military operations.

The generation of ranging overlay 422 at LEO satellite 108 will now be described in relation to FIGS. 14-17. In this regard, various processes described in relation to FIGS. 14-17 may be performed by appropriate processors of LEO satellite 108. In addition, LEO satellite 108 may be configured with appropriate software and hardware to modulate and broadcast communication signals (e.g., telephony bursts) in QPSK format.

Figure 14:
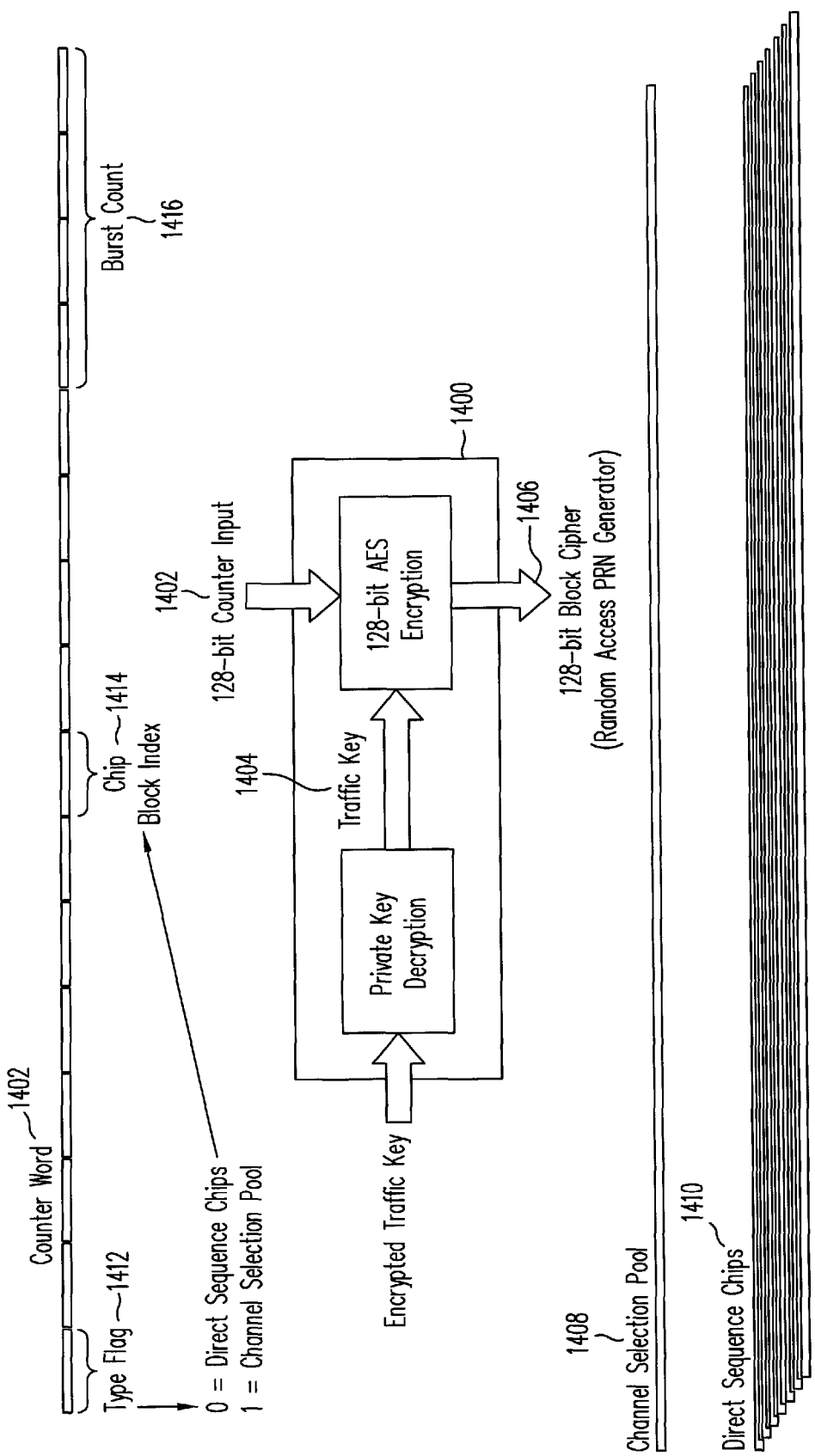
FIG. 14 illustrates a process of generating pseudo random noise in accordance with an embodiment of the invention.

FIG. 14 illustrates an approach to generating pseudo random noise in accordance with an embodiment of the invention. The embodiment shown in FIG. 14 uses a counter-based pseudo-random number generator 1400. In this regard, a counter value 1402 is combined with a 128-bit encryption traffic key 1404 to provide a 128-bit cipher. By associating counter value 1402 with cipher 1406, the various PRN elements of ranging overlay 422 can be constructed. In one embodiment, counter input 1402 and cipher may each be implemented as 128-bit words using the Advanced Encryption Standard (AES) process.

As shown in FIG. 14, each counter value 1402 may include a type flag 1412 that identifies each counter value 1402 as specifying either a channel selection (e.g., if type flag 1412 is set to a "1") or direct sequence chips (e.g., if type flag 1412 is set to a "0"). If type flag 1412 is set to channel selection, then other bits of counter value 1402 may specify which channels of a channel selection pool 1408 through which to broadcast data burst chips. If type flag 1412 is set to direct sequence, then other bits of counter value 1402 may correspond to a chip block index 1414 (e.g., specifying a particular one of direct sequence chips 1410 to be broadcast) and a burst count 1416 (e.g., specifying a frame number of the particular direct sequence chip 1410 to be broadcast).

In one embodiment, cipher 1406 can be used to select a value from a channel selection random number pool 1408 that directs frequency hopping. In another embodiment, cipher 1406 can be used to select direct sequence chips 1410 that fill up the QPSK data bits.

FIG. 15 illustrates a process of constructing uniformly distributed integers of a modulo range from channel selection pool 1408 in accordance with an embodiment of the invention. It will be appreciated that the process of FIG. 15 may be used in conjunction with channel selection pool 1408 previously described in relation to FIG. 14.

Figure 16:
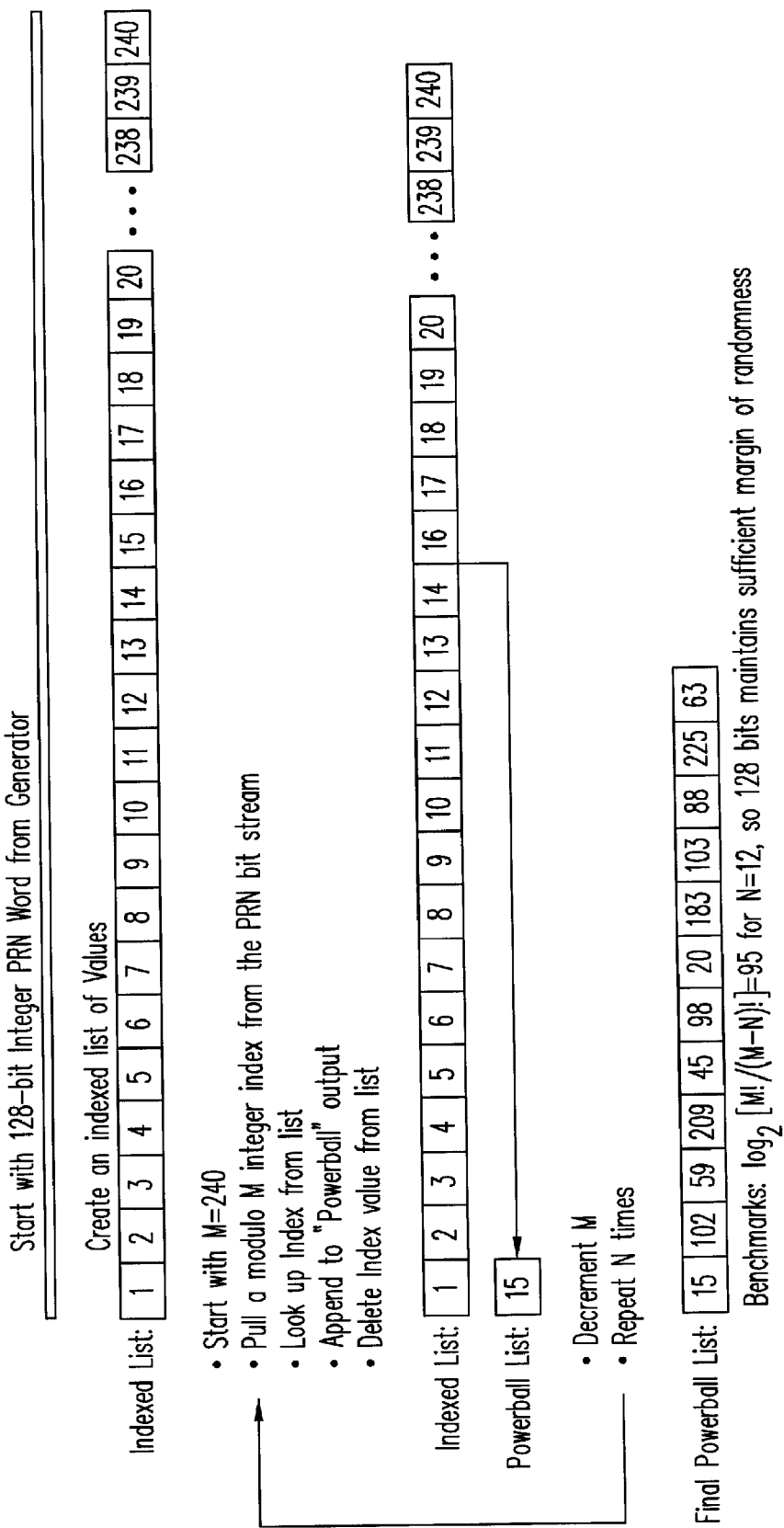
FIG. 16 illustrates a process of converting a channel selection pool to a list of random non-overlapping channels in accordance with an embodiment of the invention.

FIG. 16 illustrates a process of converting channel selection pool 1408 to a list of random non-overlapping channels in accordance with an embodiment of the invention. The process of FIG. 16 can be used for military navigation signal 104B, commercial navigation signal 104C, and civil navigation signal 104D, by selecting different parameters for M and N (shown in FIG. 16) in accordance with values provided in the following Table 4:

TABLE 4

| Signal | Power (N) | Bandwidth (M) |
|---|---|---|
| Military | Large | 240 |
| Commercial | 1 or 2 | >100 |
| Civil | 1 or 2 | 8-32 |

Figure 17:
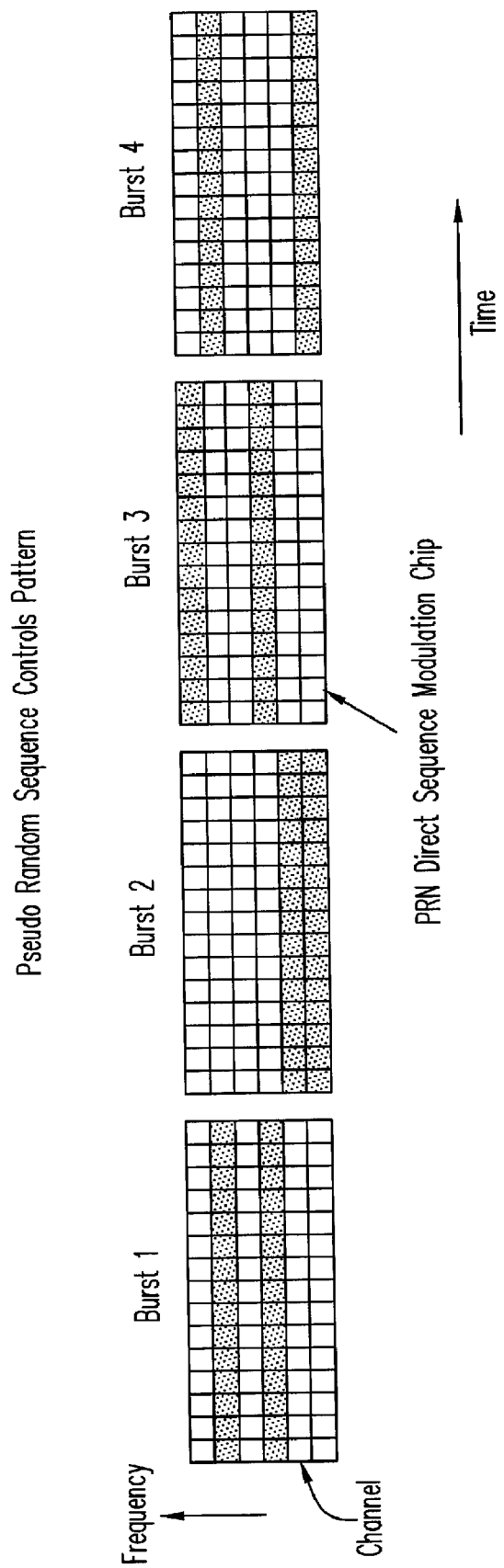
FIG. 17 illustrates a frequency hopping pattern generated by the process of FIG. 16 in accordance with an embodiment of the invention.

FIG. 17 illustrates a frequency hopping pattern generated by the process of FIG. 16 in accordance with an embodiment of the invention. As shown in FIG. 16, various random channel selections (associated with corresponding transmission frequencies) are provided for successive transmission bursts. It will be appreciated that each frequency and chip is generated in a pseudo random manner using a common key (for example, a 128-bit key) known in advance by LEO satellite 108 and navigation device 102.

Figure 18:
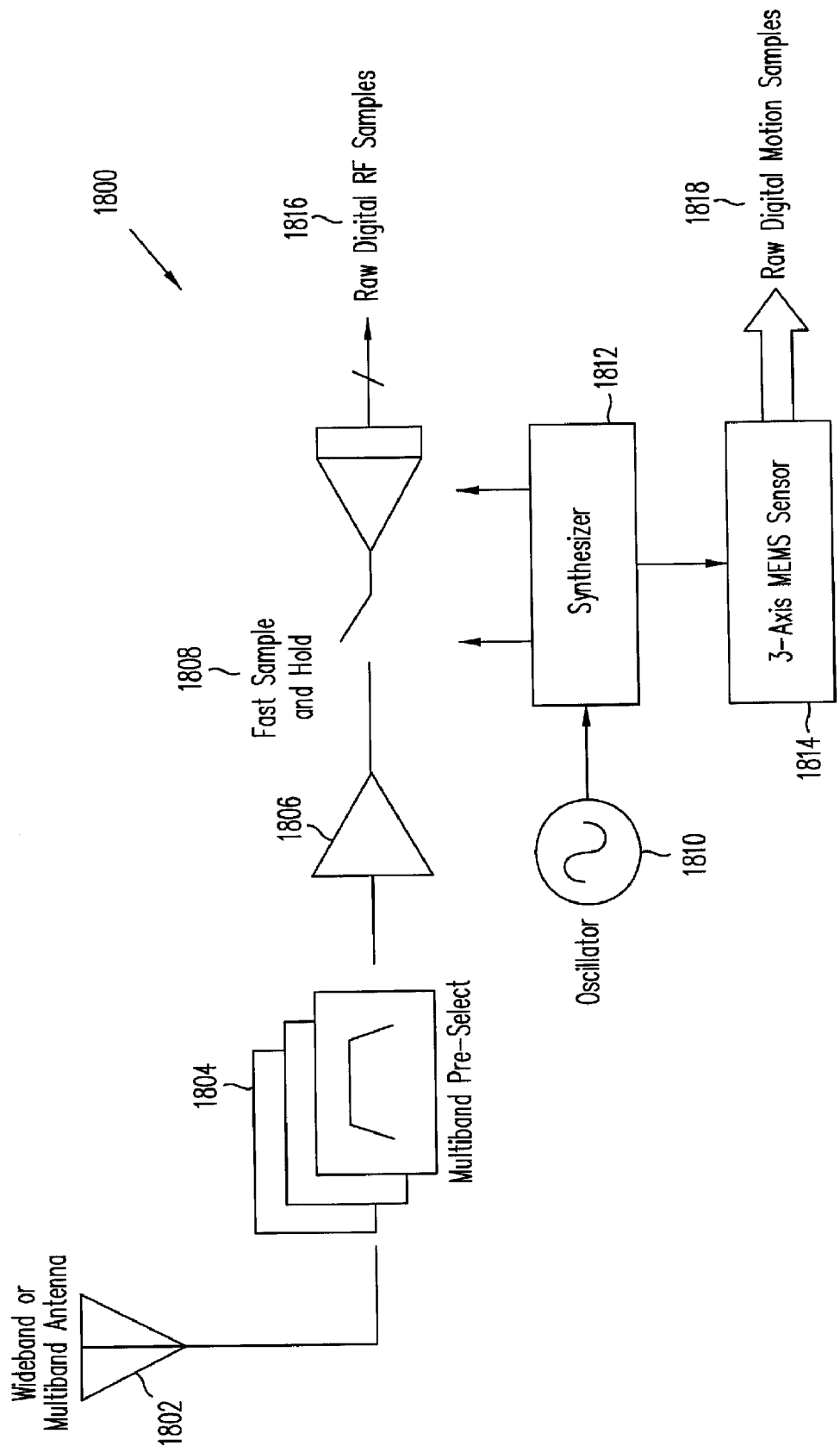
FIG. 18 illustrates a block diagram of a receiver processor configured to receive and sample navigation signals for downconversion in accordance with an embodiment of the invention.

FIGS. 18-21 illustrate various aspects of navigation device 102 that may be implemented in accordance with various embodiments of the invention. For example, FIG. 18 illustrates a block diagram of a receiver processor 1800 of navigation device 102 configured to receive and sample signals for downconversion in accordance with an embodiment of the invention. As shown in FIG. 18, navigation signals received by an antenna 1802 are filtered by multi-band filters 1804 (to preselect desired frequency bands), amplified by amplifier 1806, and sampled by sample and hold circuitry 1808 to provide raw digital RF samples 1816.

Receiver processor 1800 also includes an oscillator 1810 and synthesizer 1812 that may be used to synchronize sample and hold circuitry 1808. In various embodiments, the sample rate of sample and hold circuitry 1808 may be chosen to prevent overlap among aliased, pre-selected frequency bands.

Receiver processor 1800 also includes an IMU 1814 implemented as a 3-Axis MEMS gyro and accelerometer having measurement time tags synchronized to the common clock of the receiver, and may be used to provide raw digital motion samples 1818. It will be appreciated that other receiver implementations may alternatively be used to facilitate single or multiple-step down conversion.

Figure 19:
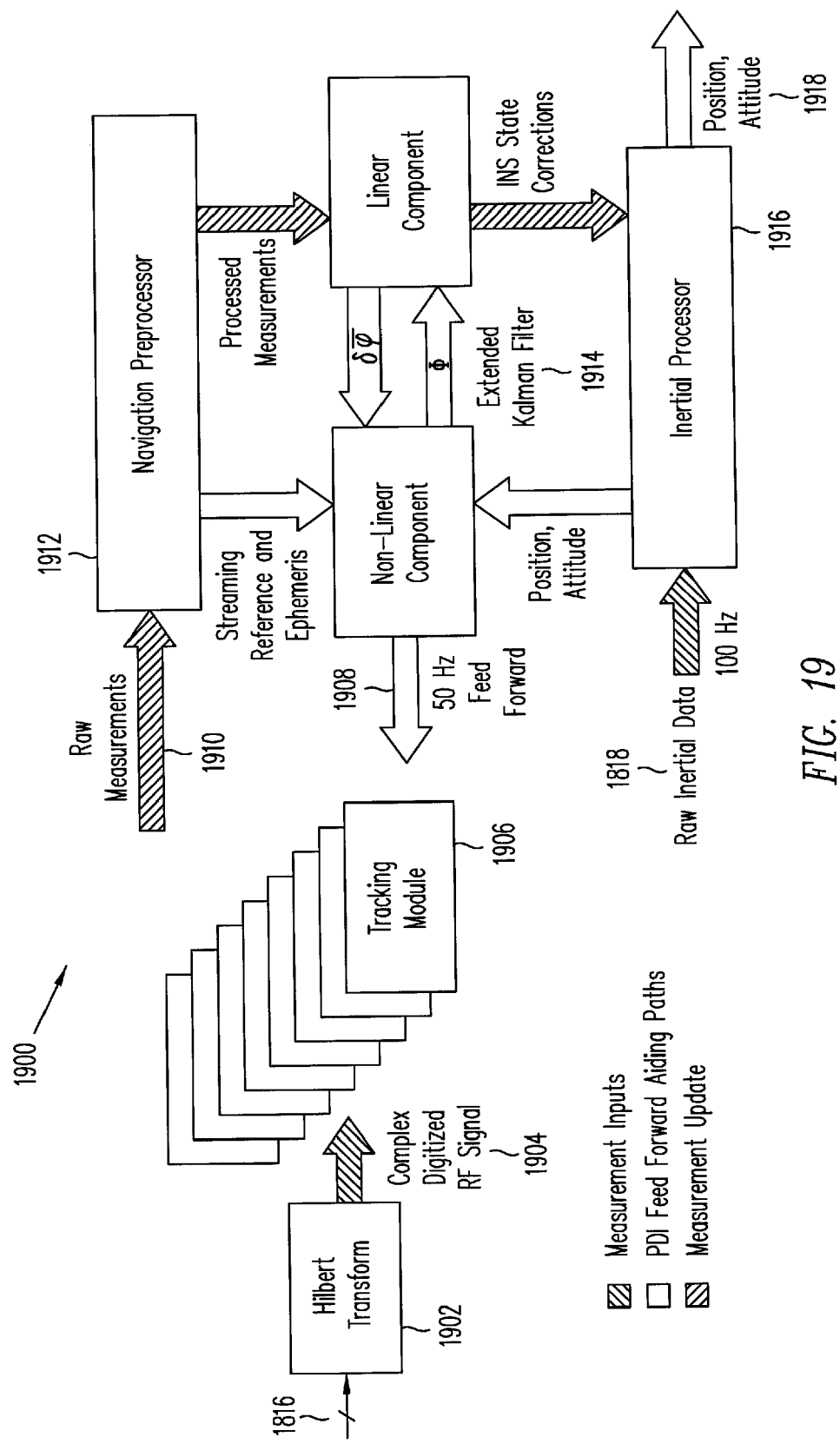
FIG. 19 illustrates a block diagram of a navigation processor configured to perform ranging processing in accordance with an embodiment of the invention.

FIG. 19 illustrates a block diagram of a navigation processor 1900 of a navigation device 102 configured to perform ranging processing in accordance with an embodiment of the invention. As shown in FIG. 19, a Hilbert transform block 1902 converts raw digital RF samples 1816 into complex samples 1904. A plurality of tracking modules 1906 are provided. Each tracking module 1906 is associated with a different signal provided in complex samples 1904, and can be used to track either satellite or terrestrial ranging sources.

Navigation processor 1900 provides feed forward commands 1908 to tracking modules 1906 based on raw digital motion samples 1818 processed by inertial processor 1916 and extended Kalman filter 1914. Aiding information 1908 drives tracking modules 1906 to a small fraction of a wavelength. The raw code and carrier phase measurements 1910 from tracking modules 1906 are read into navigation preprocessor 1912, processed by extended Kalman filter 1914, and combined to provide a position fix 1918.

FIG. 20 illustrates various state variable definitions employed by extended Kalman filter 1914 of navigation processor 1900 in accordance with an embodiment of the invention. In one embodiment, a navigation processing method disclosed by the previously referenced U.S. patent application Ser. No. 11/268,317 may be used to perform navigation using a plurality of ranging sources.

In FIG. 20, equation 2002 is a model of an integrate and dump correlator. The output tracking error Δy is modeled by averaging over time T the difference between the actual phase and the phase predicted by the filter. Equation 2004 is a continuous time update model of the complete navigation system, including inertial, clock, and all timing and ranging sources, both terrestrial and space based. The estimator state vector variables are cumulative correlator phase, user position, velocity, attitude, accelerometer bias, gyro bias, range bias, range bias rate, clock bias, and clock bias rate. Equation 2006 is the carrier phase observation model, showing time transfer feed forward to the user from the reference site taking into account geometry and atmospheric error.

Figure 21:
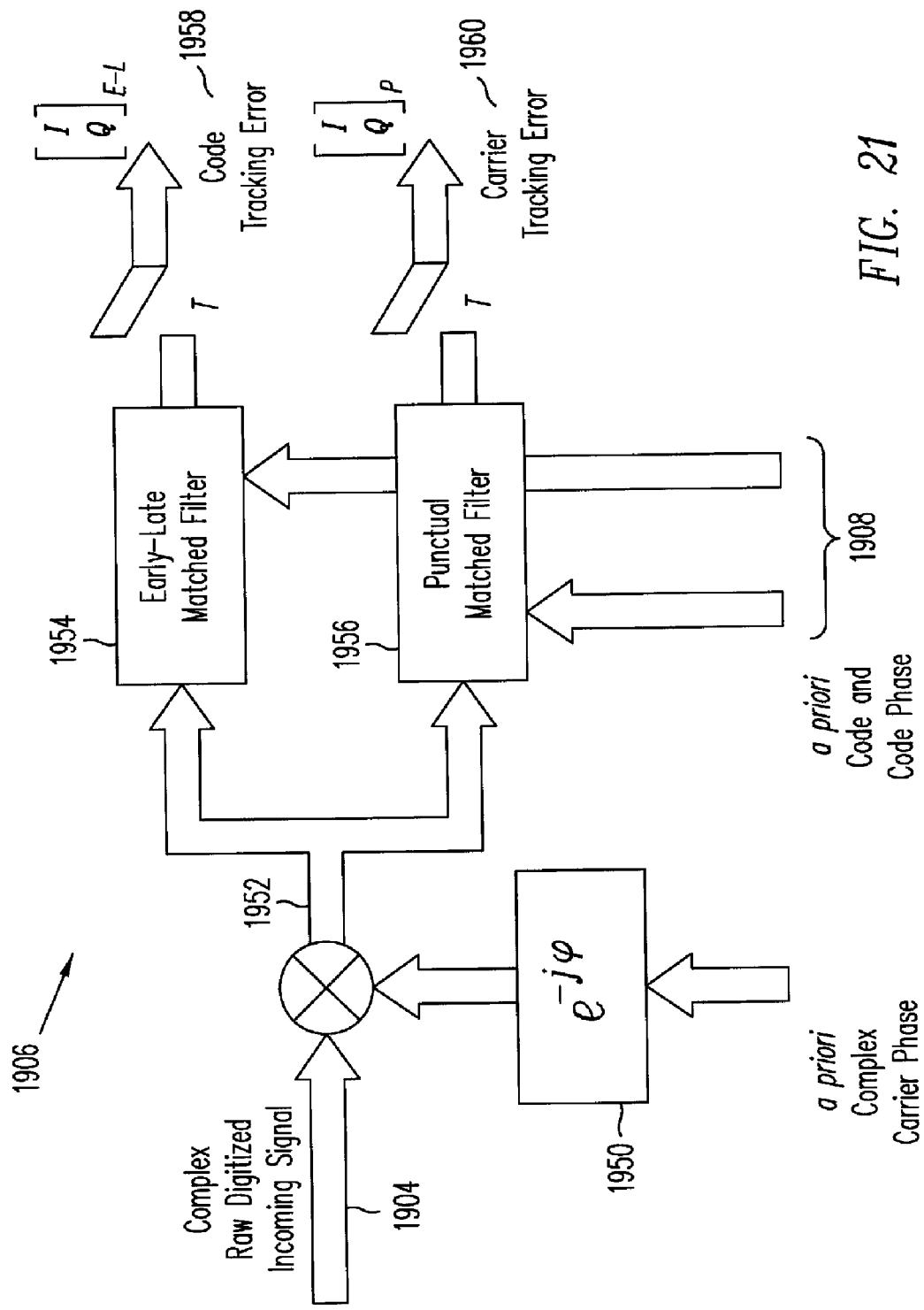
FIG. 21 illustrates a block diagram of a tracking module configured to perform signal tracking in accordance with an embodiment of the invention.

FIG. 21 illustrates a block diagram of one of tracking modules 1906 in accordance with an embodiment of the invention. Tracking module 1906 receives feed forward commands 1908 to preposition both the code and carrier phase for the particular ranging signal being tracked by tracking module 1906. Downconverter 1950 rotates the carrier provided in complex samples 1904 to baseband as a first processing step. Next, the downconverted signal 1952 signal is split and passed to a matched early minus late filter 1954 and a matched punctual filter 1956.

The signal waveform for each ranging signal in view is either pre-stored in user memory or, optionally, refreshed via a data link with a LEO satellite 108 or a network (e.g., cellular, WiFi, WiMAX, or VII) node. The data link update enables extension of the architecture to be used with virtually any transmitted signal. This impulse response (analogous to PRN code for a GPS satellite) forms a basis for matched filter processing. The impulse response of a terrestrial signal such as cellular, WiFi, WiMAX, VII, or television may be tailored by retaining the deterministic portion of the reference signal. Any portion of the signal that contains non-deterministic characteristics, such as unknown data, is nulled out in the reference signal. Each of these matched filters is then provided with the reference signal structure impulse response for implementation in the matched filter/correlator. As a result, filters 1954 and 1956 provide in-phase and quadrature representations of early minus late tracking errors 1958 and punctual tracking errors 1960, respectively.

Various data structures may be used to encode ranging sources in accordance with various embodiments of the invention. For example, in one embodiment, a ranging signal can be represented by the following code:

```
struct ranging_signal {       /* Generalized Ranging Source
Parameters */
    impulse_response  broadcast_signal;  /* signal structure of
ranging source */
    double            broadcast_frequency;  /* ranging source
frequency */
    position          broadcast_location;   /* phase center of ranging
source */
    time              broadcast_clock;      /* clock bias of ranging
source */
};
```

In the code above, the signal reference waveform is encoded as an impulse response parameter whose time origin is tied to the broadcast clock. The broadcast frequency is the carrier frequency of the ranging source. The broadcast location is encoded as a precision ephemeris for space vehicles and as a Cartesian static coordinate for terrestrial ranging sources. A clock correction calibrates the ranging source against system time based on Coordinated Universal Time (UTC) (e.g., provided by the United States Naval Observatory (USNO)).

In various embodiments, appropriate ground stations may be configured to decipher new ranging signal codes employed by LEO satellites 108 in near real-time. In this regard, such ground stations may provide the deciphered codes to navigation devices 102, thereby permitting navigation devices 102 to perform navigation using virtually any signal, cooperative or not.

Figure 22:
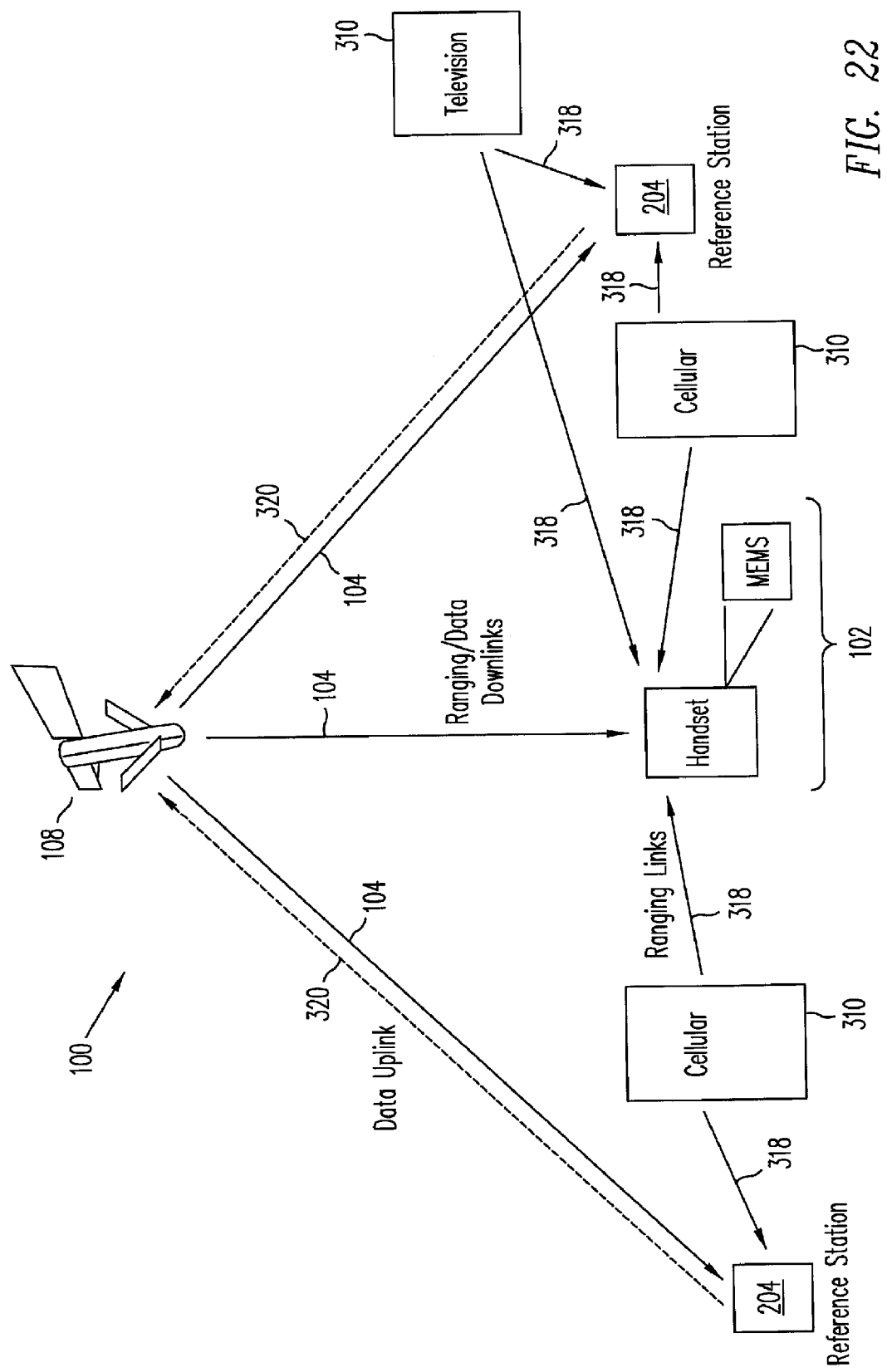
FIGS. 22-29 illustrate various uses of a navigation system to perform navigation in different environments in accordance with various embodiments of the invention.

FIGS. 22-29 illustrate various uses of system 100 to perform navigation in different environments services in accordance with various embodiments of the invention. For example, FIG. 22 illustrates the use of system 100 to provide indoor positioning in accordance with an embodiment of the invention. In this regard, it will be appreciated that in FIG. 22, navigation device 102 may be positioned inside a building or other structure.

As shown in FIG. 22, navigation device 102 (for example, a handheld user navigation device) may receive LEO signal 104 either directly from LEO satellite 108 and additional ranging signals 318 from nodes 310. As also shown, reference stations of reference network 204 may also receive ranging signals 318. As previously discussed, reference network 204 may be configured with appropriate hardware or software to determine calibration information associated with each ranging signal source 310, passed to LEO satellite 108 over data uplink 320, encoded by LEO satellite 108 into LEO signal 104, and broadcast to navigation device 102 as part of LEO signal 104. The calibration information can then be used by navigation devices 102 to interpret ranging signals 318 in order to perform navigation in combination with a ranging measurement performed using LEO signal 104. As a result, navigation device 102 may utilize LEO signal 104 and ranging signals 318 to perform navigation.

Military navigation signal 104B (e.g., provided by LEO satellite 108 as part of LEO signal 104) as well as ranging signals 318 (e.g., provided by ranging signal sources 310 such as cellular or television signal sources) may be implemented as high power signals capable of penetrating building materials to reach navigation device 102 when positioned in indoor environments. Accordingly, by using such high power signals in the approach shown in FIG. 22, navigation device 102 may perform navigation indoors and acquire quickly from a cold start.

Figure 23:
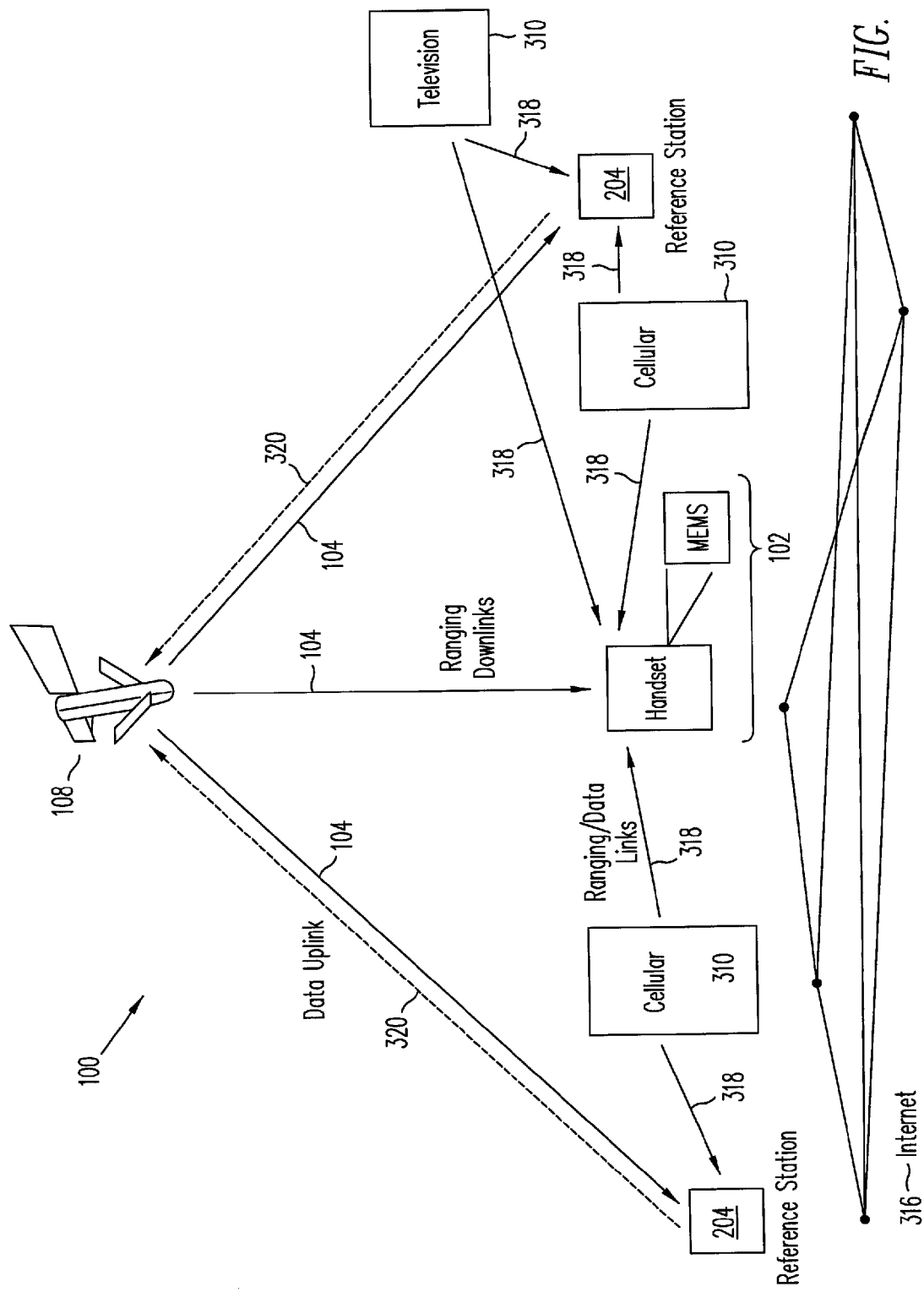

FIG. 23 illustrates the use of system 100 to provide indoor positioning in accordance with another embodiment of the invention. It will be appreciated that the implementation shown in FIG. 23 generally corresponds with the implementation of FIG. 22 previously discussed. However, in the embodiment shown in FIG. 23, navigation device 102 may also optionally communicate with reference network 204 or nodes 312 or 314 through network 316.

In addition, system 100 may be configured to employ on-tether commercial signal processing as described herein with regard to FIG. 8. In this case, a lower power commercial navigation signal 104C may be used to obtain increased processing gain by transmitting a replica of the navigation data encoded in commercial navigation signal 104C over ranging signals 318. Because the navigation data is removed using the process of FIG. 8, tracking loop bandwidth may be significantly reduced.

In one embodiment, navigation device 102 may determine its final position fix by forming a vector of pseudoranges for each ranging source, k, then linearizing about an initial guess for user position, x, and user clock bias τ.

$$\rho_k = \|x_{user} - x_{source}\|_2 + \tau = \|\bar{x}_{user} - x_{source}\|_2 - \hat{e}^T \delta x_{user} + \tau$$

$$\delta\rho_k = \rho_k - \|\bar{x}_{user} - x_{source}\|_2 = -\hat{e}^T \delta x_{user} + \tau$$

$$\delta\rho = \begin{bmatrix} & 1 \\ -E & 1 \\ & \vdots \\ & 1 \end{bmatrix} \begin{bmatrix} \delta x_{user} \\ \tau \end{bmatrix}$$

The method of least squares is used to refine the user position estimate:

$$\min_{\begin{bmatrix} \delta x_{user} \\ \tau \end{bmatrix}} \left\| \delta\rho - \begin{bmatrix} & 1 \\ -E & 1 \\ & \vdots \\ & 1 \end{bmatrix} \begin{bmatrix} \delta x_{user} \\ \tau \end{bmatrix} \right\|_2$$

Figure 24:
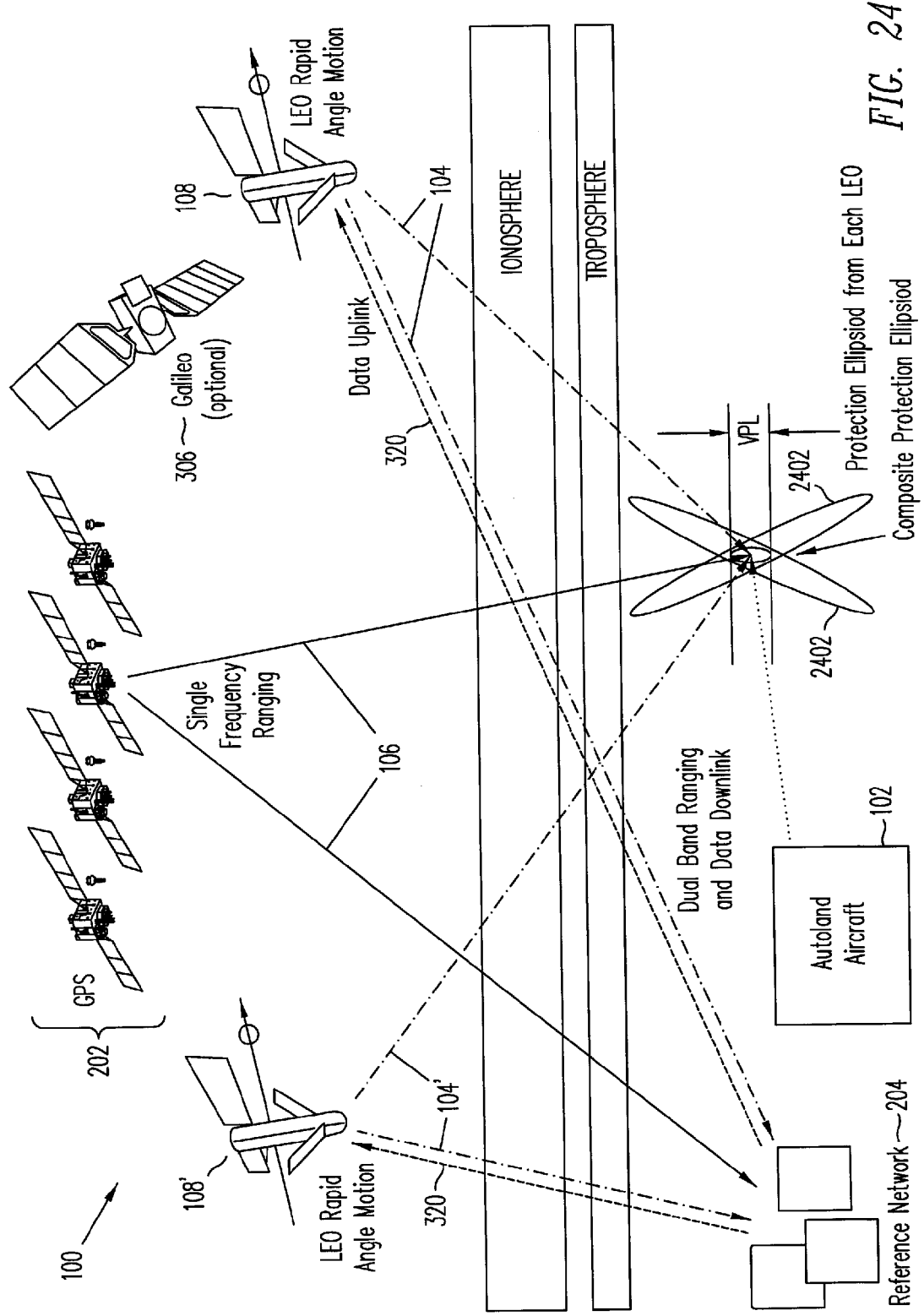

In another embodiment, system 100 may be implemented to provide high-accuracy, high-integrity navigation. In this regard, FIG. 24 illustrates the use of system 100 to perform navigation using GPS signals 106 and dual band LEO signals 104 and 104' in accordance with an embodiment of the invention. Specifically, FIG. 24 shows how a single-frequency L1 GPS signal may be used with two different LEO signals 104 and 104' (e.g., different LEO signals in different frequency bands from different LEO satellites 108 and 108') to provide a high level of navigation performance. In the embodiment shown in FIG. 24, the carriers of GPS signals 106 and LEO signals 104 and 104' are sufficient for navigation—the code phases from the signals need not be used. However, in another embodiment, both code and carrier are used to derive maximum information from the available observables.

In FIG. 24, stations of reference network 204 may monitor GPS signals 106 and LEO signals 104 and 104', and gather continuous carrier phase information to carry out precise orbit determination of GPS satellites 202 and LEO satellites 108. By using different LEO signals 104 and 104', effects of the ionosphere can be removed, yielding a carrier phase signal that is ionosphere free. Cycle ambiguities of all GPS satellites 202 and LEO satellites 104 and 104' (e.g., shown by ellipsoids 2402) by can be estimated by taking advantage of the large angle motion of LEO satellites 104 and 104'.

The position of navigation device 102 (e.g., an aircraft in this embodiment) can be determined in FIG. 24 in a manner similarly described above with regard to FIGS. 22-23. In particular, the following notation provides the kth pseudorange measurement to determine the user position, x, at epoch m, and the tropospheric zenith delay, DZ, along with all the satellite range biases, modeled as continuous variable, b.

$$\begin{bmatrix} \delta\rho_1 \\ \vdots \\ \delta\rho_M \end{bmatrix} = \begin{bmatrix} \begin{bmatrix} 1 \\ -S_1 & 1 \\ & \vdots \\ & 1 \end{bmatrix} & & \begin{bmatrix} h_{11} \\ h_{21} \\ \vdots \\ h_{K1} \end{bmatrix} & I & \\ & \ddots & & & \vdots \\ & & \begin{bmatrix} 1 \\ -S_M & 1 \\ & \vdots \\ & 1 \end{bmatrix} & \begin{bmatrix} h_{1M} \\ h_{2M} \\ \vdots \\ h_{KM} \end{bmatrix} & I \end{bmatrix} \begin{bmatrix} \begin{bmatrix} \delta x \\ \tau \end{bmatrix}_1 \\ \vdots \\ \begin{bmatrix} \delta x \\ \tau \end{bmatrix}_M \\ \frac{D_Z}{b} \end{bmatrix}$$

Again, the method of least squares is used to solve the system of equations for the position adjustments, time biases, and vector of range biases. Even though measurements using GPS signals 106 are single frequency and subject to ionospheric bias, the resulting solution does not have an ionospheric dependence. Because measurements using LEO signals 104 and 104' are ionosphere free and because LEO satellites 104 and 104' exhibit rapid angle motion (compared with the virtually static motion of GPS satellites 202), the geometry matrix is full rank with the exception of a common mode between the clock and the ranging biases. This means that the bias estimates for GPS satellites 202 take on values that position the user correctly based on the ionosphere-free measurements using LEO signals 104 and 104'.

Figure 25:
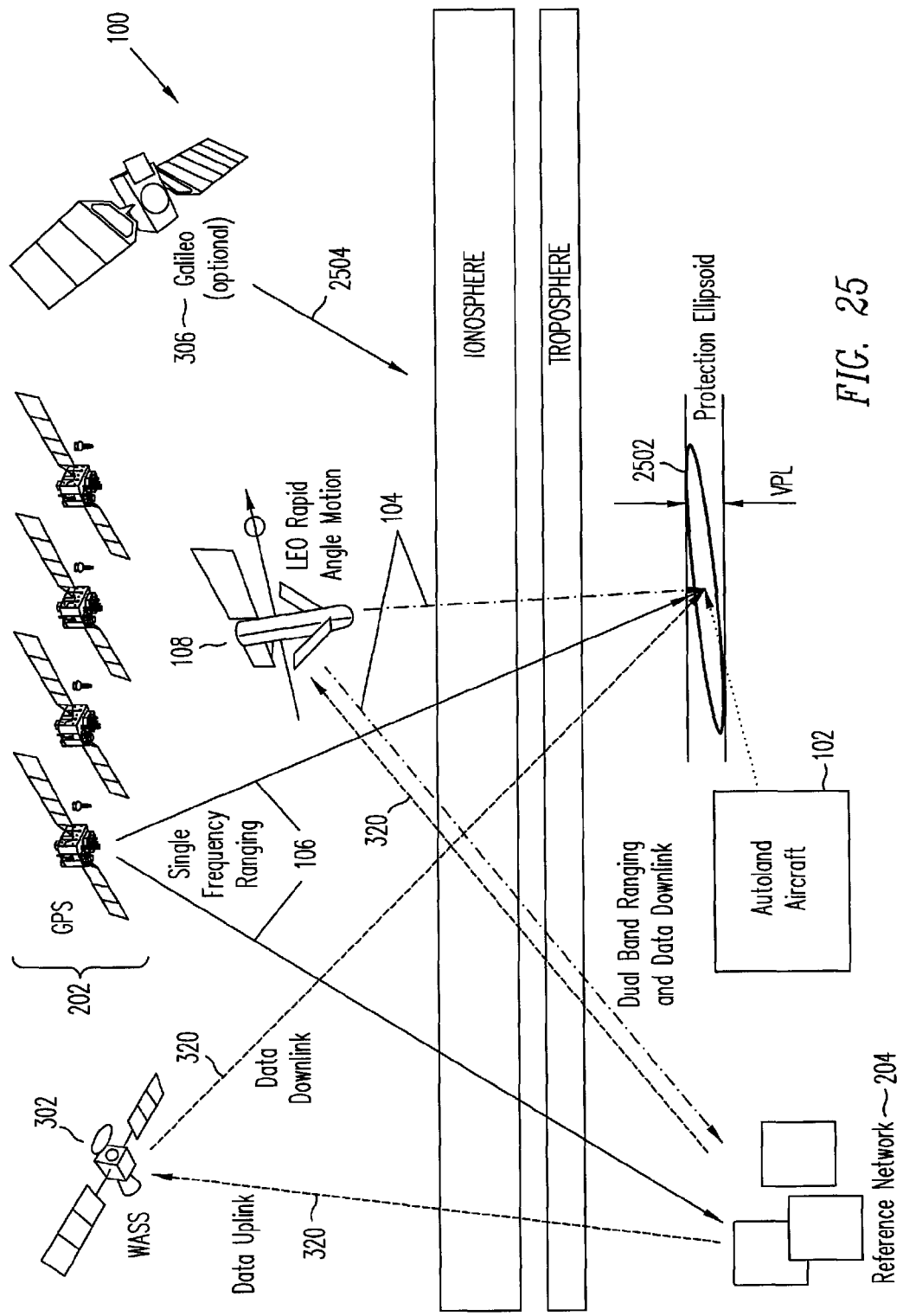

FIG. 25 illustrates the use of system 100 to perform navigation using GPS signals 106 and a single LEO signal 104 in accordance with an embodiment of the invention. The orbit geometry of a single LEO satellite 108 in view tends to place the LEO satellite 108 on a trajectory that aligns a position uncertainty ellipsoid 2502 with the local horizontal. In addition to LEO signal 104 and GPS signal 106, a third signal 2504 (e.g., from Galileo satellite 306 or another satellite) may be optionally used by navigation device 102 (e.g., an aircraft in this embodiment) to determine its position.

The integrity of a navigation system can be measured by the system's ability to provide timely warnings to users when it should not be used. In this regard, the integrity risk of a navigation system can be characterized as the probability of an undetected hazardous navigation system anomaly. In one embodiment, system 100 can be implemented to provide high integrity using Receiver Autonomous Integrity Monitoring (RAIM). In RAIM implementations, navigation device 102 can be configured to monitor measurement self-consistency to detect navigation errors associated with a variety of failure modes. Advantageously, the rapid motion of LEO satellites 108 can facilitate such measurements.

With RAIM, the residual of the least squares fit is used to carry out a chi-square hypothesis detection of a system fault. In this regard, the following equation may be used:

$$R = |\Delta\phi - H\hat{x}|$$

In the above equation, φ corresponds to ranging measurements, H corresponds to a satellite geometry matrix, and $\hat{x}$ corresponds to a position estimate. Following its determination of every position fix, navigation device 102 may be configured to calculate measurement residual R. If R is less than a threshold value, then system 100 is deemed to be operating properly. If R is greater or equal to a threshold value, the navigation device 102 may issue an integrity alarm.

Figure 26:
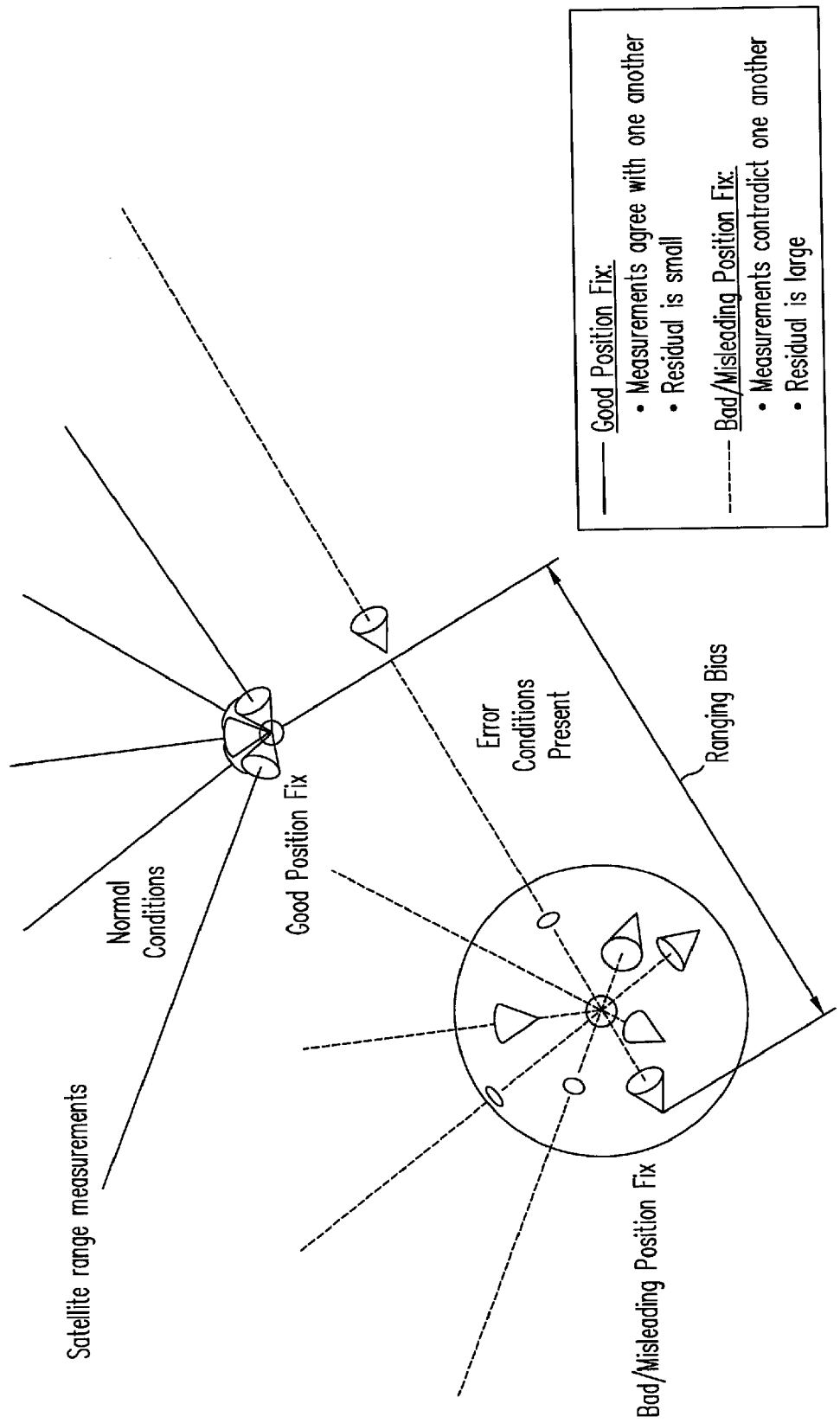

FIG. 26 shows the effect of a ranging error on a position solution in accordance with an embodiment of the invention.

Ordinarily, the ranging measurements are self consistent. However, should one or more of the measurements be corrupted and biased, the error could push the output solution away from the truth. RAIM is able to detect the error because the inconsistency among measurements is highly correlated with the actual position error.

Figure 27:
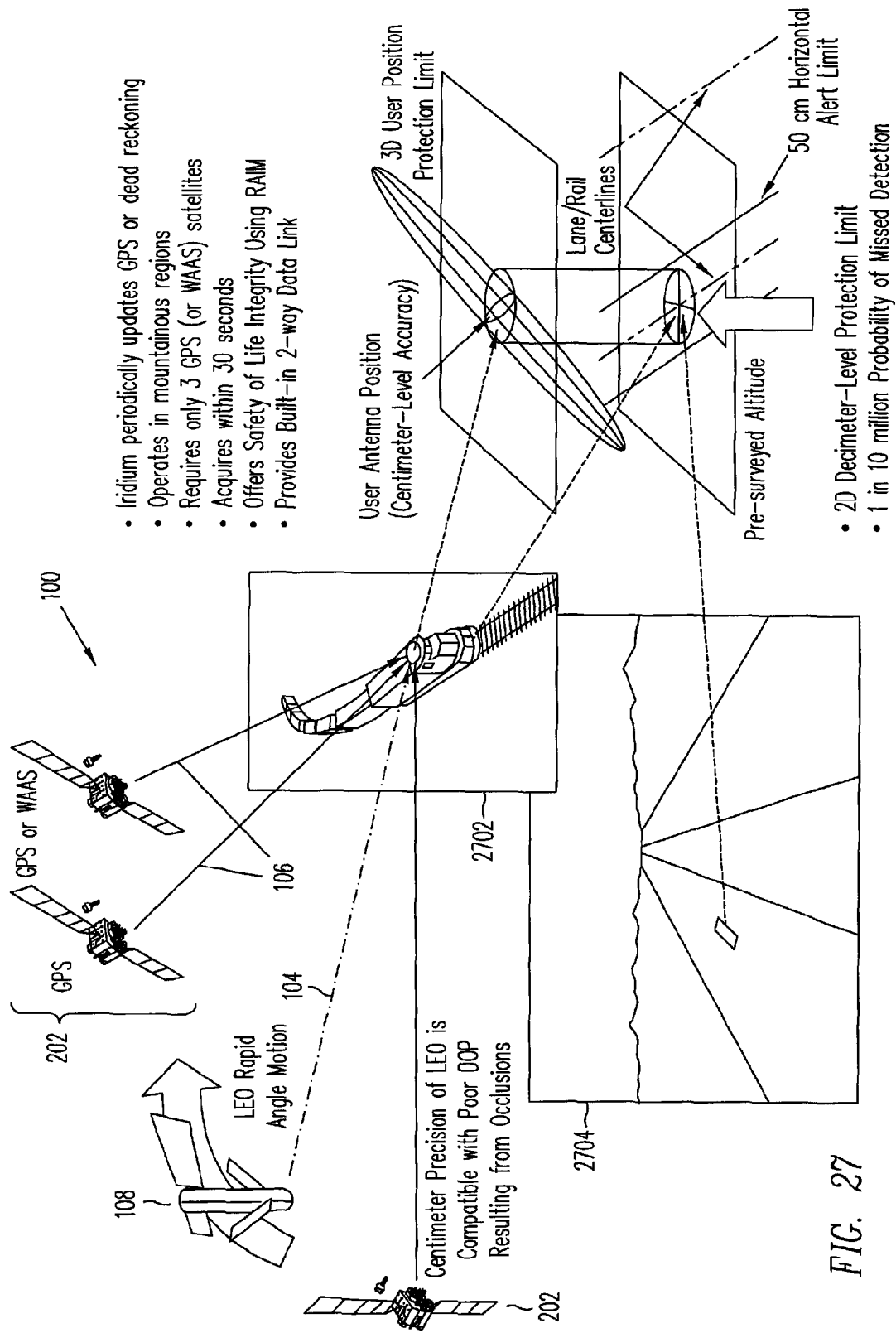

FIG. 27 illustrates how the precision of the system carrier phase counterbalances occlusion and poor Dilution of Precision (DOP) geometry. In the two-dimensional case, the least squares fit excludes the vertical component of the position error. Advantageously, in one embodiment, system 100 may be implemented with centimeter-level carrier phase precision to provide robust navigation during occlusion. As shown, the process of FIG. 27 may also use a pre-surveyed altitude map.

Figure 28:
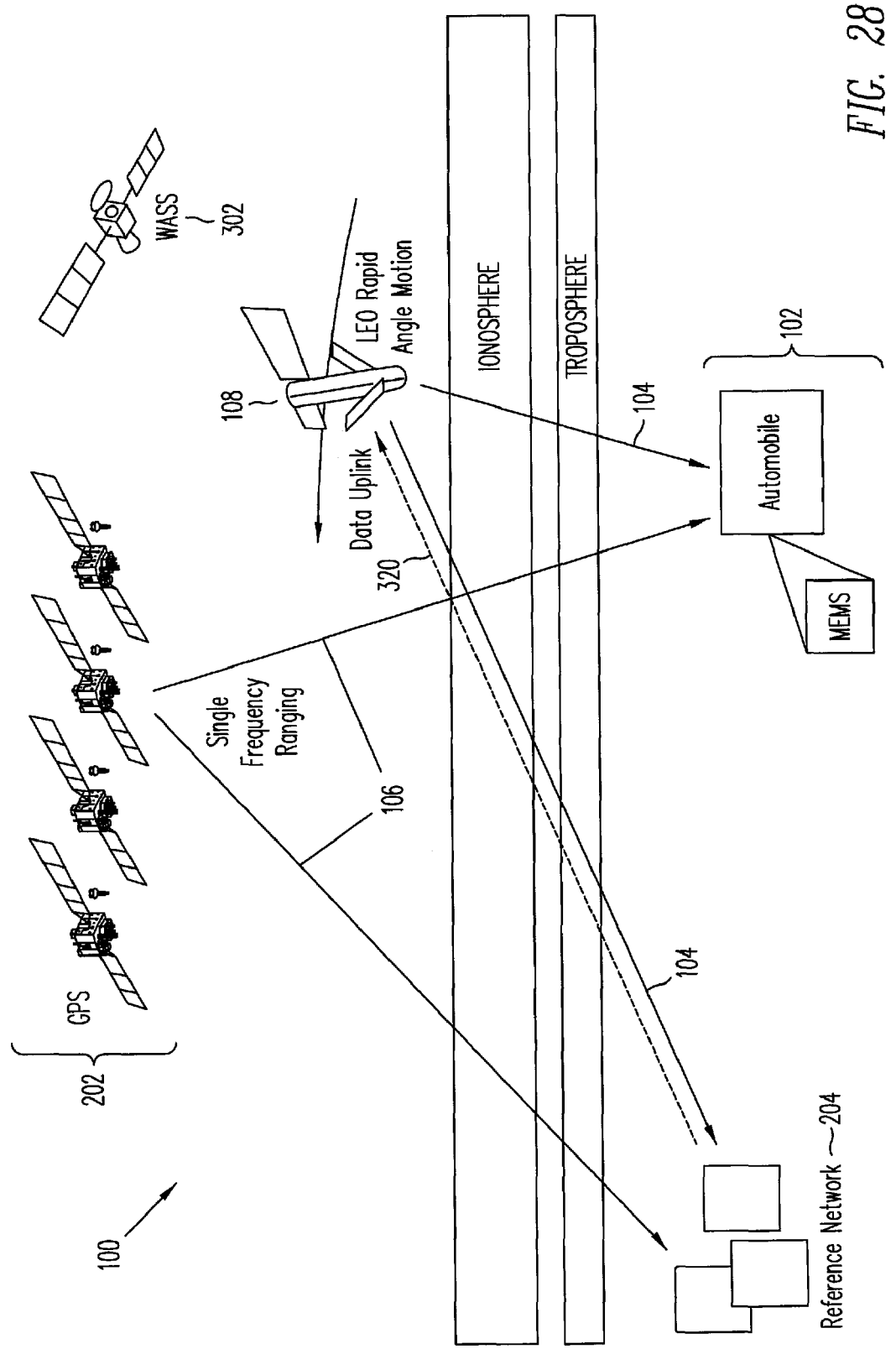
Figure 29:
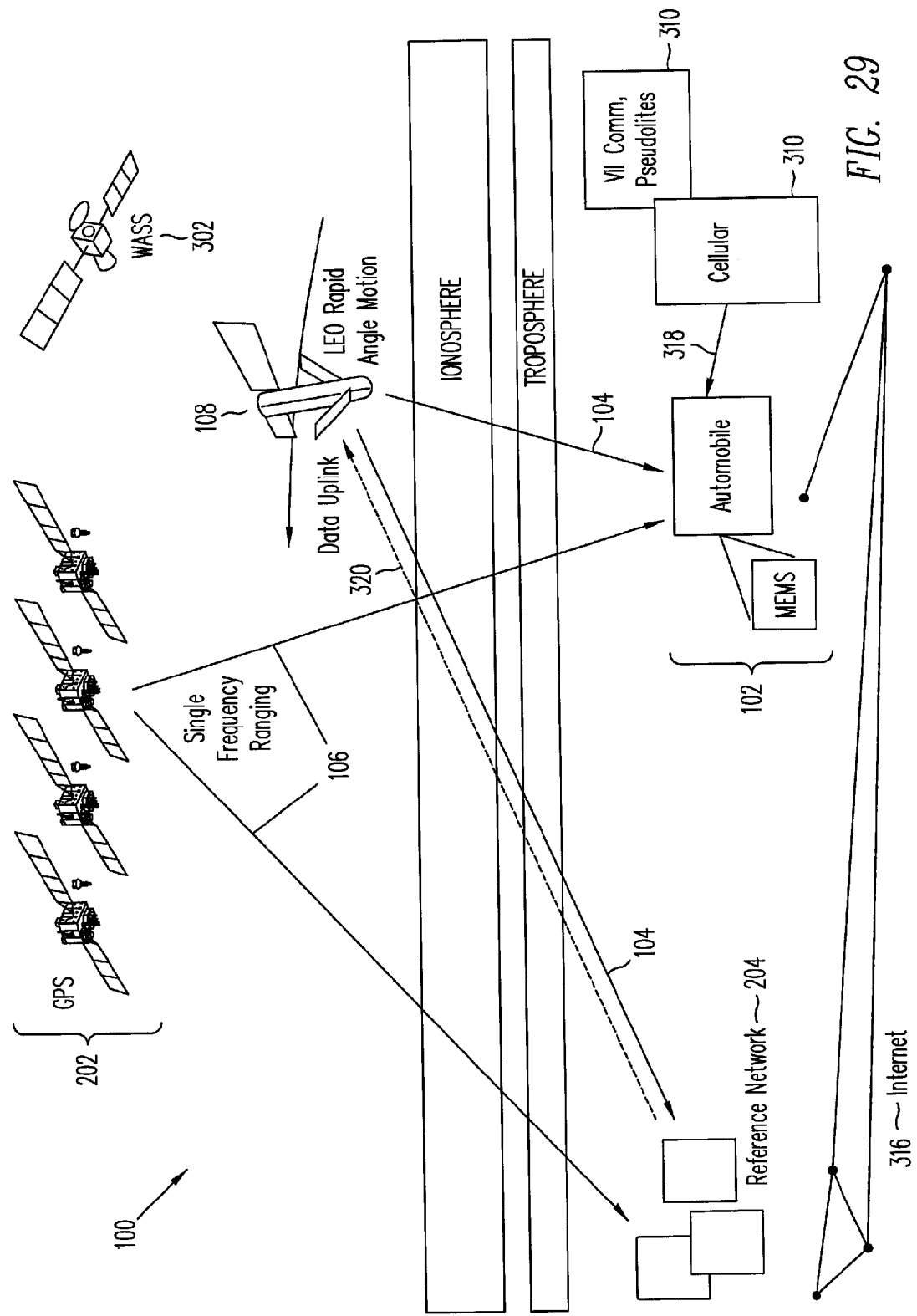

FIG. 28 illustrates the use of system 100 to perform navigation using signals received directly from LEO satellite 108 and GPS satellites 202 in accordance with an embodiment of the invention. FIG. 29 illustrates a similar implementation of FIG. 28, but with network 316 and ranging signals 318 added to preclude momentary interruptions in LEO signals 104 and GPS signals 106 from affecting the continuity of service.

As previously described, system 100 may be configured to support data uplink 320 from reference stations of reference network 204 to facilitate navigation performed by navigation devices 102 using navigation signals 104B/104C/104D. Data uplink 320 may also be supported by appropriately-configured navigation devices 102. In this regard, data uplink 320 may also be used to pass any desired data from reference network 204 and/or navigation devices 102 to LEO satellite 108 for subsequent broadcast as part of communication signal 104A of LEO signal 104.

Because GPS Time and UTC are available from a precision timing function of system 100, it is possible to establish a one-way uplink protocol that allows data uplink 320 to occur without direct two-way synchronization. The time and frequency phasing of data uplink 320 can be pre-positioned to arrive at LEO satellite 108 to exactly match the satellite's instantaneous carrier phase and frame structure on a symbol-by-symbol basis. Given a suitable multi-use protocol, it is possible to share the uplink channel among multiple navigation devices 102. Such a multi-use protocol may be implemented by time, frequency, code, or any combination thereof. In one embodiment, data uplink 320 may be configured as a spread spectrum uplink with anti-jamming and low probability of intercept and detection (LPI/D) characteristics. In another embodiment, low power signals of data uplink 320 may be summed over many symbols to pull an aggregate macro symbol out of the noise and provide an LPI/D uplink.

Figure 30:
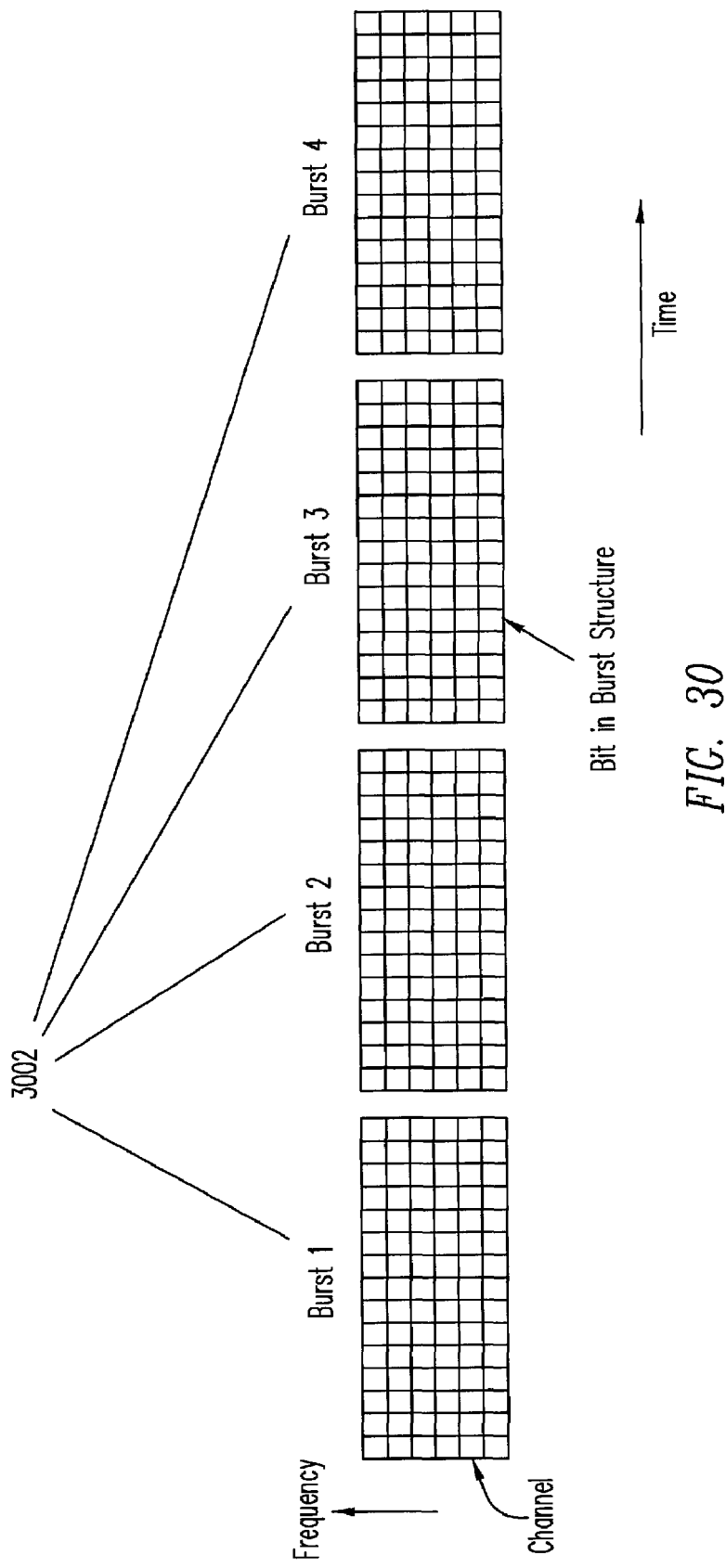
FIG. 30 illustrates a generalized frame structure for a low earth orbit satellite uplink in accordance with an embodiment of the invention.

FIG. 30 illustrates a generalized frame structure for data bursts 3002 of uplink 320 to LEO satellite 108 in accordance with an embodiment of the invention. In one embodiment, data uplink 320 may be configured to support uplink bursts on approximately 240 channels with 414 bits per burst. For data uplink 320 to be aligned properly on a symbol by symbol basis, in one embodiment, the frame structure of LEO satellite 108 may be pre-positioned in a rest state (e.g., no time shift and no frequency shift relative to a master clock of LEO satellite 108). In another embodiment, a reference station of reference network 204 may be configured to generate an appropriate synchronization signal for data uplink 320 to LEO satellite 108. The effect of this synchronization signal is to pre-align the frame structure for the data symbols in a burst against the UTC or GPS Time reference.

Figure 31:
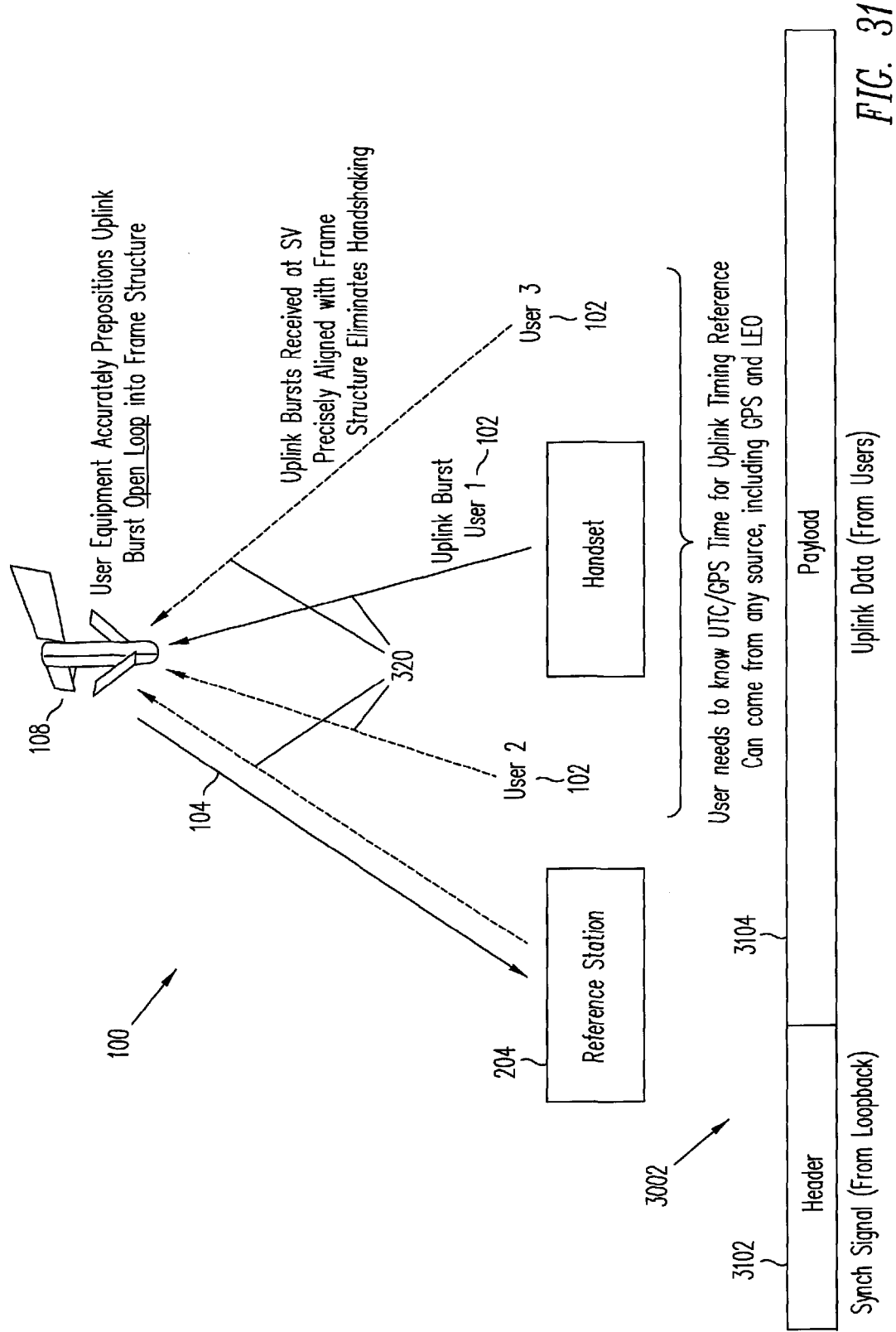
FIG. 31 illustrates a ground infrastructure to synchronize a low earth orbit satellite data uplink in accordance with an embodiment of the invention.

FIG. 31 illustrates a ground infrastructure to synchronize data uplink 320 in accordance with an embodiment of the invention. In particular, the ground infrastructure of FIG. 31 includes a reference station of reference network 204 that may be used to align a payload field 3104 of each data burst 3002. In one embodiment, the reference station may be configured to not broadcast during the portion of the burst allocated to payload 3104 (this time is reserved for navigation devices 102). In one embodiment, each of navigation devices 102 may be authorized to uplink a single symbol within a certain time and frequency slot. In this manner, each symbol (or each orthogonal bit in the QPSK uplink frame structure) is individually addressable by any navigation device 102 that knows its position and UTC/GPS Time. Navigation devices 102 may be implemented in accordance with any appropriate multi-use protocol by which navigation devices 102 are assigned the bits in the defined fields. For example, under a CDMA protocol, multiple navigation devices 102 may even share the same bits.

In various embodiments, data uplink 320 may be implemented with low power signals. For example, in one embodiment, uplink 320 may be implemented using milliwatt-level broadcasts to transmit several bits of data per second to LEO satellite 108. If this power is spread over, for example, a 10 MHz bandwidth, the resulting power flux spectral density is reasonable for LPI/D applications. Such a spread spectrum implementation of uplink 320 may also provide antijam protection.

Figure 32:
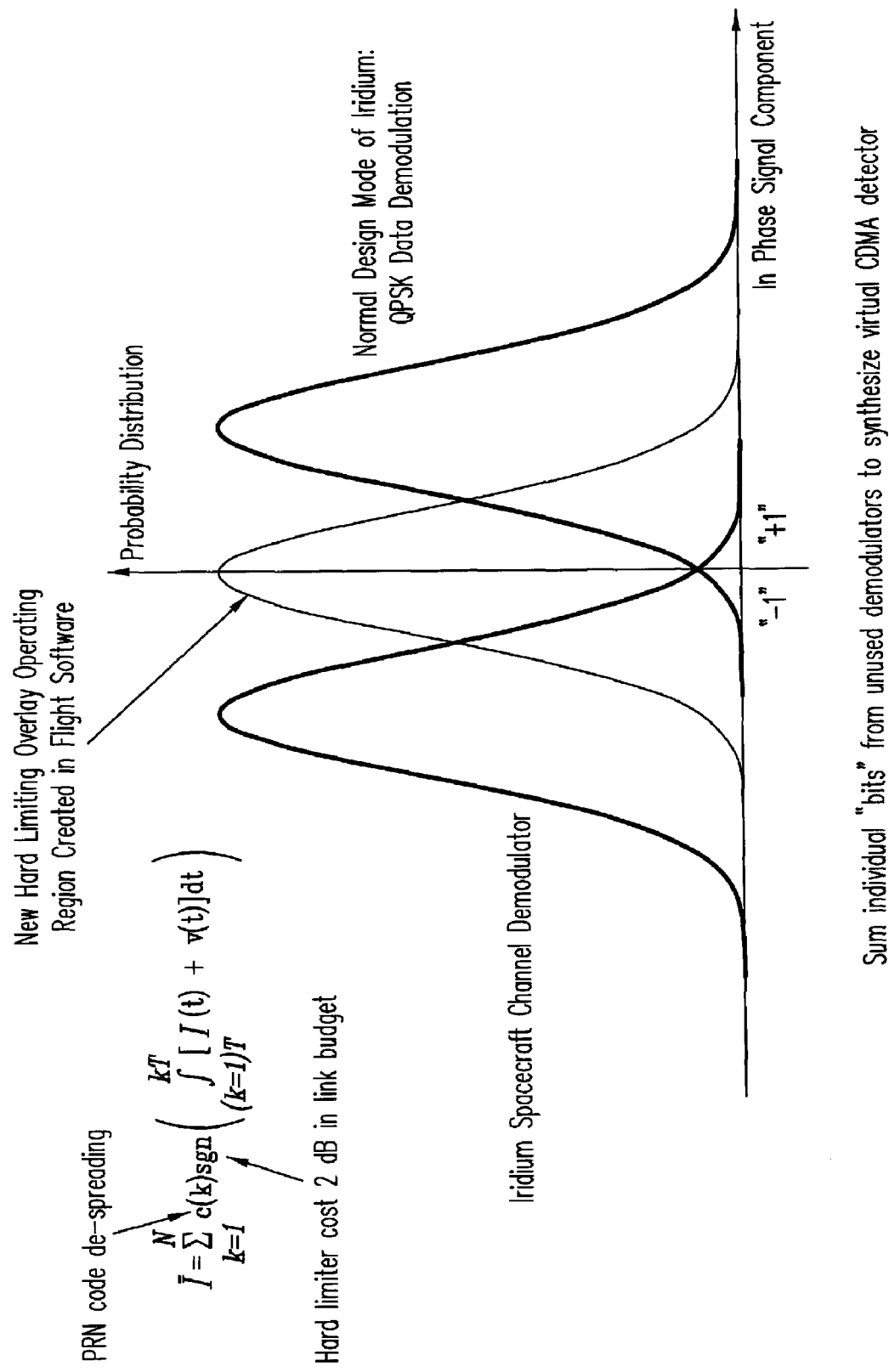
FIG. 32 illustrates an implementation of a low level data uplink signal in accordance with an embodiment of the invention.

FIG. 32 illustrates an implementation of a low level signal used for data uplink 320 in accordance with an embodiment of the invention. In one embodiment, LEO satellite 108 may be configured to receive each bit in a QPSK modulation along with background noise. Because QPSK can be synthesized from two orthogonal binary phase-shift key (BPSK) streams, a simplified BPSK probability distribution (pair of offset Gaussian distributions) is shown in FIG. 32. Normally, a detector in a demodulator of LEO satellite 108 makes a "1" or "0" (noted here as −1) decision based on a threshold value at zero, and the probability of a bit error is calculated by integrating the area under the Gaussian as a function of SNR.

In one embodiment, the demodulator is treated as a hard limiter. When the SNR is much less than unity, the center Gaussian curve shown in FIG. 32 is representative. The presence of a signal (i.e., a data bit) will ever so slightly shift the curve from one side to the other, but in general, the output will be swamped by noise. However, by averaging many discrete samples together, LEO satellite 108 can detect the emergence of a signal. Calculations known to those skilled in the art place the loss of a hard limiter at about 2 dB. In other words, but for a 2 dB effective analog to digital conversion loss, the input signal is completely preserved—even if LEO satellite 108 was originally implemented as communication satellite. The above approach is not limited to particular implementations of LEO satellite 108.

In various embodiments, processing of data bits can be performed by reference network 104, navigation device 102, or onboard LEO satellite 108. In another embodiment, custom engineered demodulators with a multi-bit RF front end may be used to eliminate the 2 dB hard limiter loss in LEO satellites 108 implemented with analog bent pipe configurations.

Figure 33:
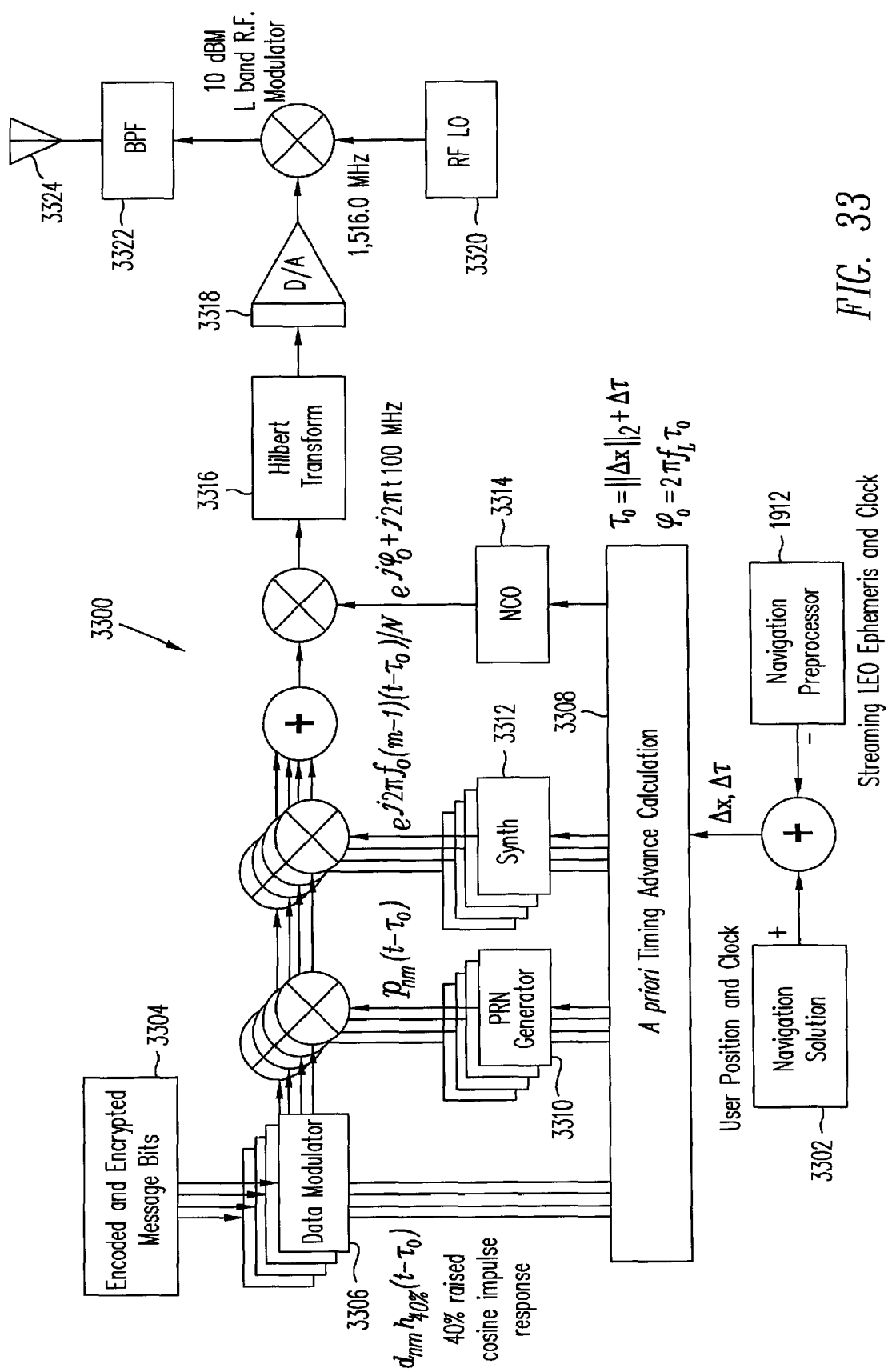
FIG. 33 illustrates a block diagram of a transmitter to support a low earth orbit satellite data uplink in accordance with an embodiment of the invention.

FIG. 33 illustrates a block diagram of a transmitter 3300 configured to support data uplink 320 in accordance with an embodiment of the invention. In this regard, it will be appreciated that transmitter 3300 may be provided as part of a reference station of reference network 204 or as part of one or more navigation devices 102. For example, in one embodiment transmitter 330 may be integrated into a handheld Defense Advanced GPS Receiver (DAGR) handheld device, cellular telephone handset, or any other compact, low-cost device. Advantageously, such navigation devices 102 may be configured to permit users of such devices to send low-latency text or status messages from anywhere in the world over data uplink 320 for further broadcast over communication signal 104A.

As shown in FIG. 33, the position and clock of navigation device 102 (e.g., provided by navigation solution 3302), and the position and clock offset of LEO satellite 108 (e.g., provided by navigation preprocessor 1912) are differenced to form an a priori timing advance parameter $\tau_0$ used by timing advance calculation block 3308 as shown. In this regard, $\tau_0$ corresponds to the lead time by which the transmission of an individual data bit, $d_{nm}$, should be advanced to arrive at LEO satellite 108 at precisely the right time and phasing.

The timing advance parameter then governs the synthesis of the signal in the baseband processor. The data to be uplinked is encoded and encrypted in block 3304 according to user preference. Data modulator block 3306 generates 40% root raised cosine pulses that are modulated by the appropriate data bit, PRN direct sequence code, and channel frequency offset provided by PRN generator block 3310 and synthesizer block 3312. Any desired number of channels can be concurrently processed in parallel. The signals are summed, upconverted (in this case by 100 MHz), converted to real form, converted from digital to analog, and upconverted to RF for broadcast as shown by blocks 3316 through 3324 of FIG. 33.

For compact and low power operation, the baseband component may be implemented to reside in the modified baseband real estate of a DAGR or cellular handset. In one embodiment, antenna 3324 may also be used for GPS signals in a DAGR or cellular handset. In one embodiment, the power consumption and form factor of the data uplink broadcast hardware may be implemented for handset or compact use. For example, in one embodiment, such transmit hardware may be implemented by a RF2638 chip available from RF Micro Devices that provides 10 dBm of RF output power and draws 25 mA at 3V.

Figure 34:
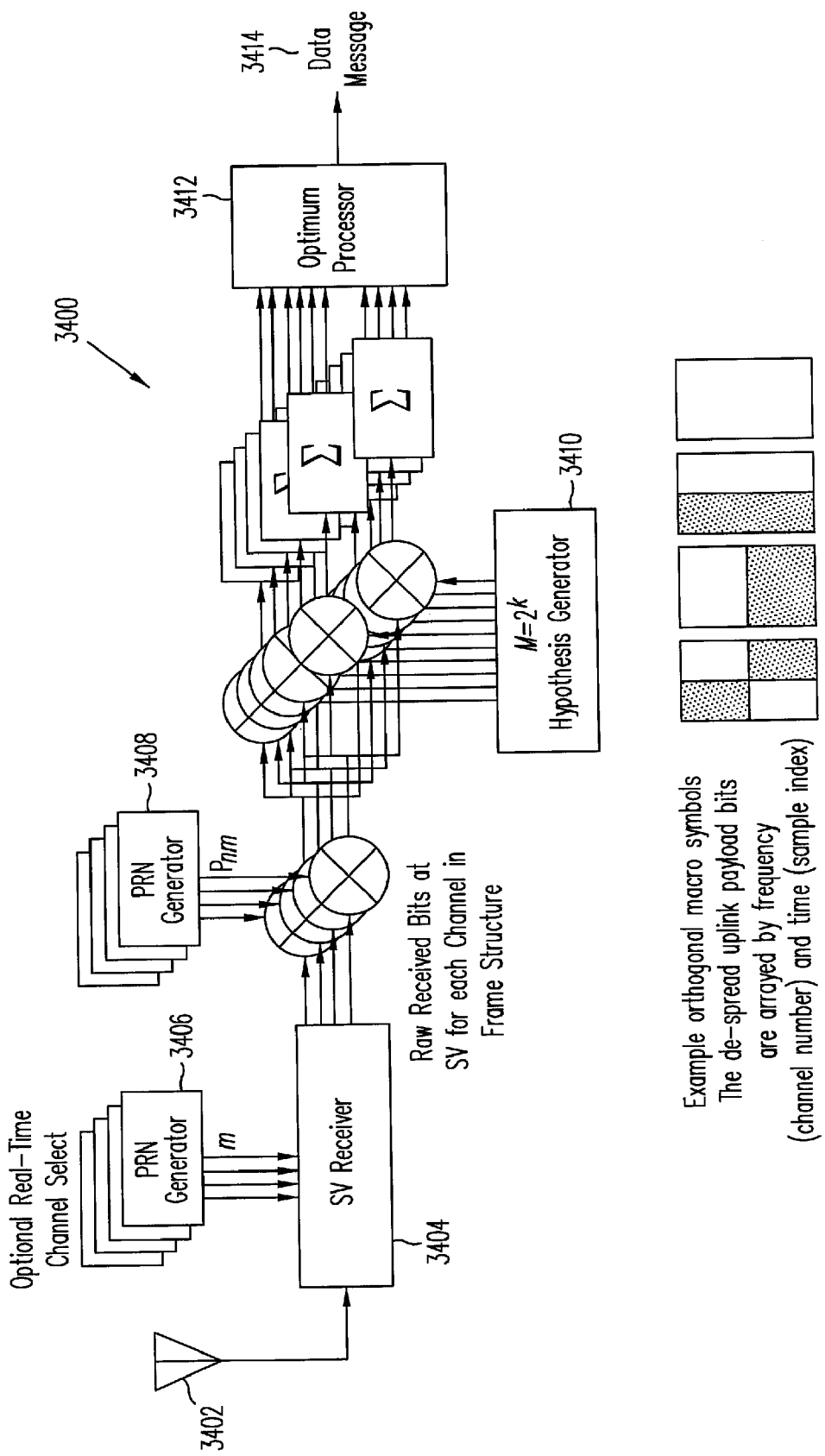
FIG. 34 illustrates a block diagram of various components of a low earth orbit satellite configured to support a data uplink in accordance with an embodiment of the invention.

FIG. 34 illustrates a block diagram of various components 3400 of LEO satellite 108 configured to support data uplink 320 in accordance with an embodiment of the invention. In one embodiment, LEO satellite 108 may be configured to receive data bit impulses through an antenna 3402 and a receiver block 3404, and fill the internal frame structure with the resulting decision, namely +1 or −1. PRN generator block 3406 commands frequency hopping on the uplink in a pattern known in advance by both navigation device 102 and LEO satellite 108. The direct sequence PRN code is also applied to the incoming bits by PRN generator block 3408. Waveforms associated with the various macro symbol hypotheses (provided by hypothesis generator block 3410) are mixed with the incoming signal and then processed by a processor 3412 (e.g., in the manner previously described with regard to processor 718) to provide the resulting data message 3414. As with LEO signal 104 also described herein, orthogonal encoding provides excellent bit energy per noise spectral density (Eb/N0) performance for data uplink 320.

Data uplink 320 also contains a built-in ranging signal by virtue of the PRN coding modulation. Optionally, a delay-locked loop (DLL) may be provided in LEO satellite 108 to estimate the range from navigation device 102 to LEO satellite 108. As a result, it is possible to perform reverse triangulation and use multiple LEO satellites 108 to passively triangulate the position of navigation device 102.

Advantageously, system 100 may be used to provide desired features in a variety of applications. For example, in one embodiment, system 100 may be implemented to provide rapid, directed rekeying. Using public-private key infrastructure techniques with system 100, navigation devices 102 may be authenticated using a two-way data link prior to passing encrypted traffic keys over the air. In this manner, positive control can be maintained over the specific user, receiver, location, and time of rekeying.

In another embodiment, system 100 may be implemented to support joint blue force situational awareness. In this regard, navigation devices 102 can share position information with other friendly forces nearby, and hazard areas and information on adversary locations can be shared in real time.

In another embodiment, system 100 may be implemented to support communications navigation and surveillance-air traffic management. In this regard, navigation devices 102 may be implemented in aircraft (e.g., in place of the antenna and GPS card in an aircraft's Multi-Mode Receiver (MMR)) to enable Cat III landing, a built-in communication link, integrated automatic dependent surveillance, and integrated space-based air traffic control.

In another embodiment, system 100 may be implemented to support search and rescue. In this regard, navigation devices 102 may be configured to provide global E911 features for both military and civil purposes. The LPI/D characteristics of the military version of data uplink 320 could qualify a modified DAGR to be employed under hostile conditions.

In another embodiment, system 100 may be implemented to support enroute retargeting. In this regard, guided munitions may be commanded or retargeted in real time using commands issued by a modified DAGR.

In another embodiment, system 100 may be implemented to support battle damage assessment. In this regard, information gathered in human or sensor form, including position information, can be quickly aggregated via data uplink 320. In another embodiment, system 100 may be implemented to support weather information correlated by position can be aggregated in real time.

In another embodiment, system 100 may be implemented to permit a network of navigation devices 102 to aggregate measurements of jammer power or use time or frequency characteristics in a jammer to triangulate their exact locations.

In another embodiment, system 100 may be implemented to support spot beam control. In this regard, an envelope of authority to control spot beam power for antijam purposes may be delegated to navigation devices 102. For example, if jamming is experienced, navigation devices 102 may be configured to request a real-time increase in the broadcast power of LEO signal 104. Such an implementation could be made available to military or civil safety of life users, with the envelope of authority determined by government policy.

In another embodiment, system 100 may be implemented to support global cellular text messaging. For example, data uplink 320 capability may be provided in navigation device 102 (e.g., a modified DAGR or cellular telephone handset) to permit text messages to be sent to and from any location worldwide.

Embodiments described above illustrate but do not limit the invention. It should also be understood that numerous modifications and variations are possible in accordance with the principles of the present invention. Accordingly, the scope of the invention is defined only by the following claims.

We claim:

1. A method of performing navigation, the method comprising:
   receiving a low earth orbit (LEO) signal from a LEO satellite, wherein the LEO signal comprises:
   a plurality of communication channels, a plurality of communication signals provided in the communication channels, a plurality of navigation channels, and a navigation signal comprising navigation data encoded in a navigation carrier signal distributed over the navigation channels by a pseudo random noise (PRN) encoding;

decoding the navigation signal from the LEO signal;

receiving first and second ranging signals from first and second ranging sources, respectively;

receiving calibration information associated with the first and second ranging sources; and calculating a position using the navigation signal, the first and second ranging signals, and the calibration information.

2. The method of claim 1, wherein the LEO satellite is a communication satellite configured to provide the LEO signal.

3. The method of claim 2, wherein the LEO satellite is selected from the group consisting of an Iridium satellite and a Globalstar satellite.

4. The method of claim 1, wherein the navigation signal is selected from the group consisting of a military navigation signal, a commercial navigation signal, and a civilian navigation signal.

5. The method of claim 1, wherein at least one of the ranging signals is selected from the group consisting of a cellular telephone signal, a television signal, and a global positioning system (GPS) signal.

6. The method of claim 1, wherein the calibration information comprises code timing, carrier phase, data bits, and symbol phase.

7. The method of claim 1, further comprising:

receiving a replica of the navigation signal through a cellular network; and calculating the position using the replica of the navigation signal, the first and second ranging signals, and the calibration information.

8. The method of claim 1, wherein the method is performed by a device selected from the group consisting of a handheld navigation device, a vehicle-based navigation device, and an aircraft-based navigation device.

9. The method of claim 1, wherein the decoding comprises:

selecting a plurality of the navigation channels of the LEO signal carrying the navigation signal;

despreading the navigation signal from the navigation channels; and demodulating the navigation data and the navigation carrier from the navigation signal.

10. The method of claim 1, wherein the decoding comprises decrypting the navigation signal using a distributed encryption key associated with an area of operations.

11. The method of claim 1, wherein at least one of the ranging signals is a single-frequency global positioning system (GPS) L1 signal.

12. The method of claim 1, wherein performance of the method is conditioned on possession of an encryption key by a navigation device.

13. The method of claim 1, wherein the communication signals are telephone calls.

14. The method of claim 1, wherein the calibration information is received as part of the navigation signal of the LEO signal.

15. The method of claim 1, wherein the calibration information is received from a reference station in communication with the ranging sources.

16. The method of claim 1, wherein the calibration information is received through a cellular network.

17. A navigation device comprising:

an antenna adapted to receive a low earth orbit (LEO) signal from a LEO satellite, receive first and second ranging signals from first and second ranging sources, respectively, and receive calibration information associated with the first and second ranging sources, wherein the LEO signal comprises:

a plurality of communication channels, a plurality of communication signals provided in the communication channels, a plurality of navigation channels, and a navigation signal comprising navigation data encoded in a navigation carrier signal distributed over the navigation channels by a pseudo random noise (PRN) encoding;

a receiver processor adapted to downconvert the LEO signal for further processing; and a navigation processor adapted to:

decode the navigation signal from the LEO signal, decode the calibration information from the LEO signal, and calculate a position of the navigation device using the navigation signal, the first and second ranging signals, and the calibration information.

18. The navigation device of claim 17, wherein the LEO satellite is a communication satellite configured to provide the LEO signal.

19. The navigation device of claim 18, wherein the LEO satellite is selected from the group consisting of an Iridium satellite and a Globalstar satellite.

20. The navigation device of claim 17, wherein the navigation signal is selected from the group consisting of a military navigation signal, a commercial navigation signal, and a civilian navigation signal.

21. The navigation device of claim 17, wherein at least one of the ranging signals is selected from the group consisting of a cellular telephone signal, a television signal, and a global positioning system (GPS) signal.

22. The navigation device of claim 17, wherein the calibration information comprises code timing, carrier phase, data bits, and symbol phase.

23. The navigation device of claim 17, wherein the antenna is adapted to receive a replica of the navigation signal through a cellular network, wherein the navigation processor is adapted to calculate the position using the replica of the navigation signal, the first and second ranging signals, and the calibration information.

24. The navigation device of claim 17, wherein the navigation device is selected from the group consisting of a handheld navigation device, a vehicle-based navigation device, and an aircraft-based navigation device.

25. The navigation device of claim 17, wherein the navigation processor is adapted to:

select the navigation channels of the LEO signal carrying the navigation signal;

despread the navigation signal from the navigation channels; and demodulate the navigation data and the navigation carrier from the navigation signal.

26. The navigation device of claim 17, wherein the navigation processor is adapted to decrypt the navigation signal using a distributed encryption key associated with an area of operations.

27. The navigation device of claim 17, wherein at least one of the ranging signals is a single-frequency global positioning system (GPS) L1 signal.

28. The navigation device of claim 17, wherein the communication signals are telephone calls.

29. The navigation device of claim 17, wherein the calibration information is received as part of the navigation signal of the LEO signal.

30. The navigation device of claim 17, wherein the calibration information is received from a reference station in communication with the ranging sources.

31. The navigation device of claim 17, wherein the calibration information is received through a cellular network.

32. A navigation device comprising:
  means for receiving a low earth orbit (LEO) signal from a LEO satellite, wherein the LEO signal comprises:
    a plurality of communication channels,
    a plurality of communication signals provided in the communication channels,
    a plurality of navigation channels, and
    a navigation signal comprising navigation data encoded in a navigation carrier signal distributed over the navigation channels by a pseudo random noise (PRN) encoding;
  means for decoding the navigation signal from the LEO signal;
  means for receiving first and second ranging signals from first and second ranging sources, respectively;
  means for receiving calibration information associated with the first and second ranging sources;
  means for calculating a position using the navigation signal, the first and second ranging signals, and the calibration information.

33. The navigation device of claim 32, wherein the navigation device is part of a navigation and communication system comprising the LEO satellite, a reference network, and the first and second ranging sources.

34. The navigation device of claim 32, further comprising means for estimating ionosphere effects using a single-frequency global positioning system (GPS) L1 signal.

35. The navigation device of claim 32, further comprising means for providing three-dimensional autoland guidance for an aircraft using the navigation signal and the first ranging signal, wherein the first ranging source is a satellite.

36. The navigation device of claim 32, further comprising means for providing vertical autoland guidance using the navigation signal.

37. The navigation device of claim 32, further comprising means for providing two-dimensional vehicle guidance using an altitude map and the navigation signal.

38. The navigation device of claim 32, further comprising means for implementing Receiver Autonomous Integrity Monitoring (RAIM).

39. The navigation device of claim 32, wherein the communication signals are telephone calls.

40. The navigation device of claim 32, wherein the calibration information is received as part of the navigation signal of the LEO signal.

41. The navigation device of claim 32, wherein the calibration information is received from a reference station in communication with the ranging sources.

42. The navigation device of claim 32, wherein the calibration information is received through a cellular network.

* * * * *